(12) United States Patent
Yip et al.

(10) Patent No.: US 6,411,736 B1
(45) Date of Patent: Jun. 25, 2002

(54) METHOD AND APPARATUS FOR DECODING

(75) Inventors: Dominic Yip, Lindfield; Trevor Robert Elbourne, Fairlight, both of (AU)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/161,771

(22) Filed: Sep. 29, 1998

(30) Foreign Application Priority Data

Sep. 29, 1997 (AU) .............................. PO9519

(51) Int. Cl.[7] .................................................. G06K 9/36
(52) U.S. Cl. ........................................ 382/233; 382/248
(58) Field of Search ................................ 382/232, 233, 382/234, 235, 236, 244, 245, 246, 247, 248, 249, 250, 240, 260, 276, 251, 205, 238, 239, 242, 252; 348/397, 398, 403, 404, 405, 406, 408, 437, 438

(56) References Cited

U.S. PATENT DOCUMENTS

| | | | | |
|---|---|---|---|---|
| 4,982,345 A | * | 1/1991 | Callahan et al. ............. | 364/521 |
| 5,434,567 A | * | 7/1995 | Mack et al. ................... | 341/50 |
| 5,764,802 A | * | 6/1998 | Simon ......................... | 382/236 |
| 5,867,602 A | * | 2/1999 | Zandi et al. ................. | 382/248 |
| 5,905,815 A | * | 5/1999 | Mack et al. ................. | 382/250 |
| 5,966,465 A | * | 10/1999 | Keith et al. ................. | 382/232 |
| 6,141,446 A | * | 10/2000 | Boliek et al. ............... | 382/233 |
| 6,163,626 A | | 12/2000 | Andrew ....................... | 382/240 |

OTHER PUBLICATIONS

I. Stollinitz et al., "Wavelet For Computer Graphics", 1996, pp. ix–xiii and 1–5.

* cited by examiner

*Primary Examiner*—Phuoc Tran
*Assistant Examiner*—Amir Alavi
(74) *Attorney, Agent, or Firm*—Fitzpatrick, Cella, Harper & Scinto

(57) ABSTRACT

An apparatus is disclosed for decoding a stream of previously encoded coefficients including input means for receiving the stream of encoded coefficients; bit plane level monitoring means connected to the input means and adapted to monitor a current bit plane level from the stream of coefficients; pixel generation means interconnected to the input means and the bit plane level monitoring means and adapted to utilize the current bit plane level for generating output coefficient values each having a predetermined size. The bit plane level monitoring means can include a finite state control machine interconnected to the input means and adapted for determining bit plane level changes in the coefficient input stream; a counter interconnected to the finite state control machine for monitoring a current bit plane level; a heap store interconnected to the counter and the finite state control machine and adapted store bit plane level values for utilization in recursion operations by the finite state control machine; and wherein the finite state machine acts to decrement the counter upon the receipt of a bit level change indicator in the coefficient input stream and further to control the reloading of the counter upon completion of the recursion operations.

18 Claims, 19 Drawing Sheets

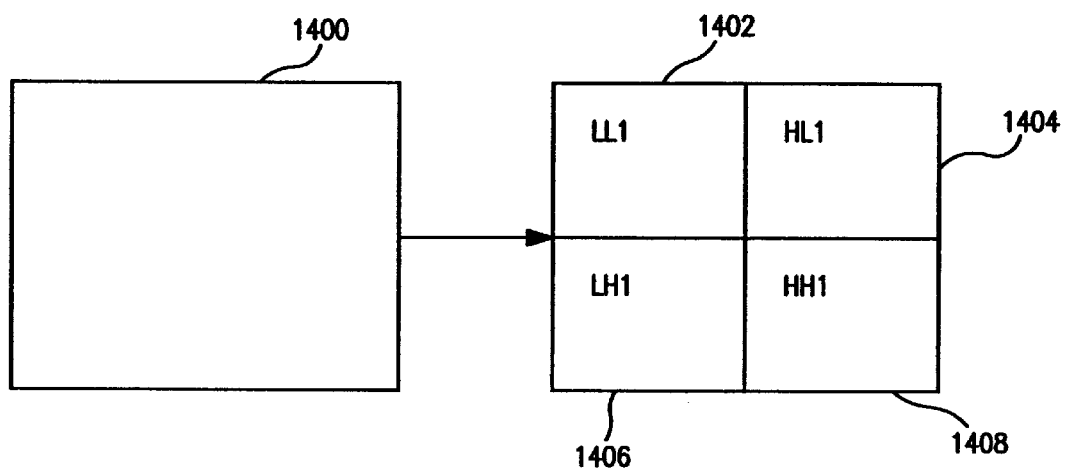
FIG. 14
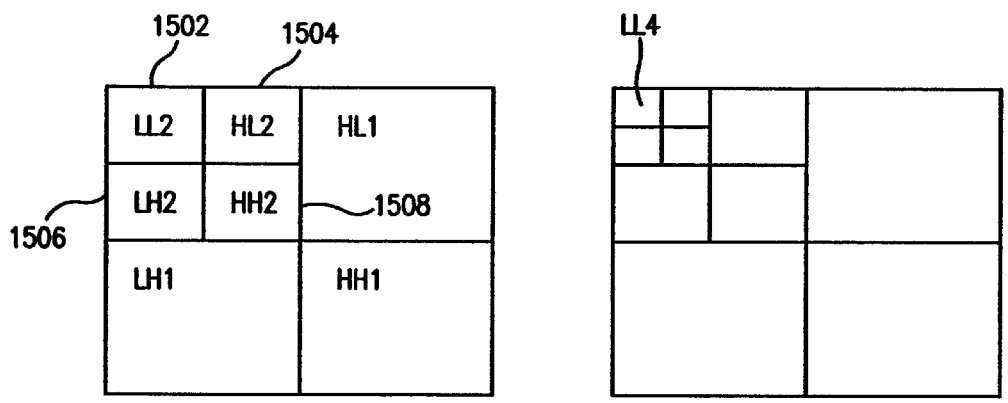
FIG. 15
FIG. 16

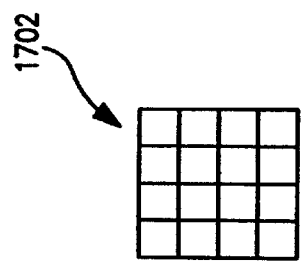
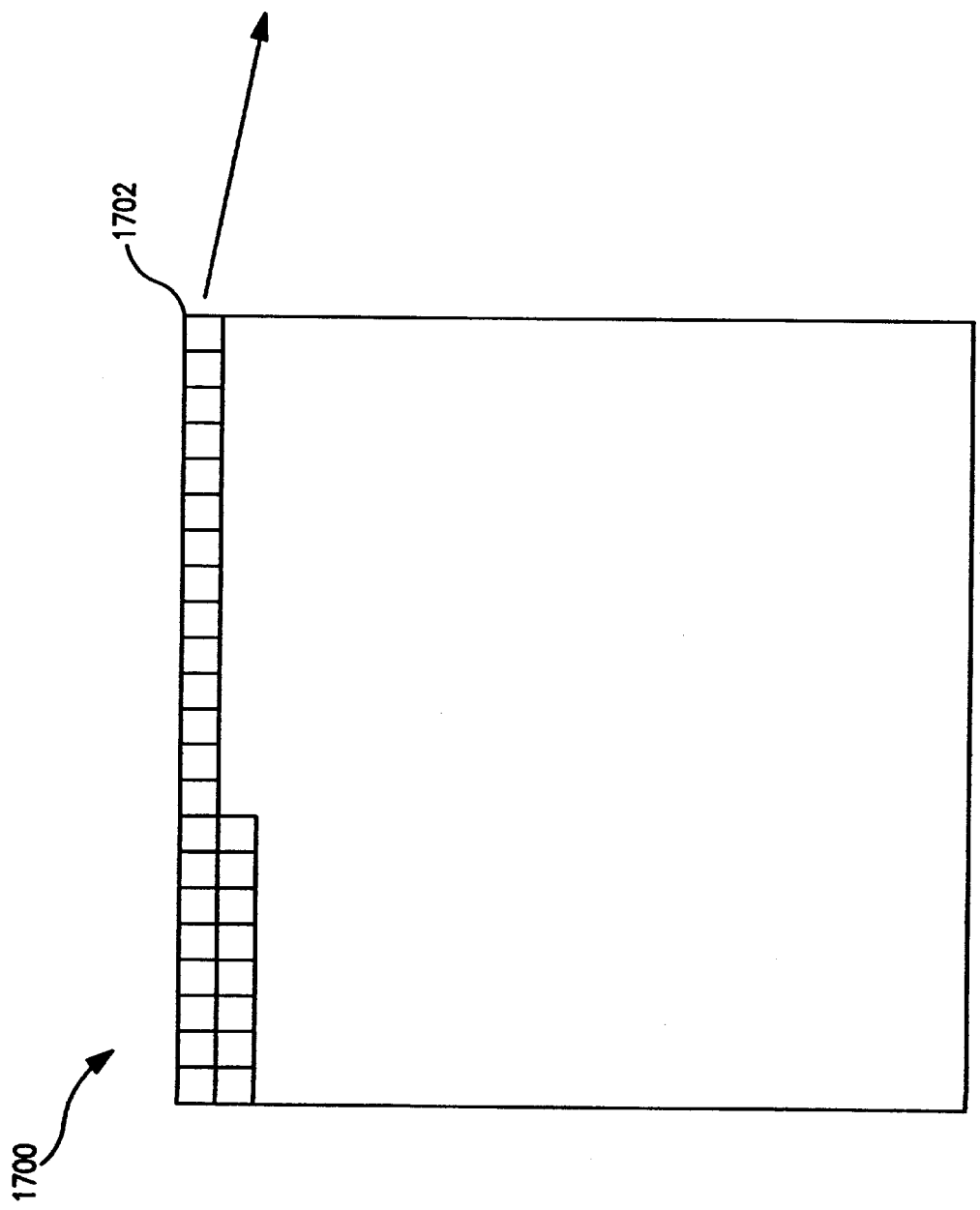
FIG. 17A
FIG. 17

1800

1802

| 33 (00100001) | 17 (00010001) | 4 (00000100) | 1 (00000001) |
|---|---|---|---|
| 8 (00001000) | 9 (00001001) | 3 (00000011) | 0 (00000000) |
| 2 (00000010) | 1 (00000001) | 1 (00000001) | 0 (00000000) |
| 1 (00000001) | 0 (00000000) | 0 (00000000) | 0 (00000000) |

Fig. 18

| Bit Plane Level | Code Output | Coefficient Output | Item Number |
|---|---|---|---|
| 8 | 0 | | (2000) |
| 7 | 0 | | (2002) |
| 6 | 1 | 100001 | (2004) |
| | 0 | | (2006) |
| 5 | 1 | 10001 01000 01001 | (2008) |
| | 0 | | (2010) |
| 4 | 0 | | (2012) |
| 3 | 1 | | (2014) |
| | 1 | 100 001 011 000 | (2016) |
| 3 | 0 | | (2018) |
| 2 | 1 | 10 01 01 00 | (2020) |
| 3 | 0 | | (2022) |
| 2 | 0 | | (2024) |
| 1 | 1 | 1 0 0 0 | (2026) |

Fig. 20

METHOD AND APPARATUS FOR DECODING

FIELD OF INVENTION

The present invention relates to the field of data compression and in particular, discloses an architecture for decoding coefficients that, have been constructed as a result of a compression process. The invention also relates to a computer program product, including a computer readable medium having recorded thereon a computer program for decoding a bitstream of previously encoded coefficients.

BACKGROUND OF INVENTION

The field of digital data compression and in particular digital image compression has attracted great interest for some time.

In the field of digital image compression, many different techniques have been utilized. In particular, one popular technique is the JPEG standard, which utilizes the discrete cosine transform to transform standard size blocks of an image into corresponding cosine components. In this respect, the higher frequency cosine components are heavily quantised so as to assist in obtaining substantial compression factors. The heavy quantisation is an example of a "lossy" technique of image compression. The JPEG standard also provides for the subsequent lossless compression of the transformed coefficients.

Recently, the field of wavelet transforms has gained great attention as an alternative form of data compression. The wavelet transform has been found to be highly suitable in representing data having discontinuities such as sharp edges. Such discontinuities are often present in image data or the like.

Although the preferred embodiments of the present invention will be described with reference to the compression of image data, it will be readily evident that the preferred embodiment is not limited thereto. For examples of the many different applications of Wavelet analysis to signals, reference is made to a survey article entitled "Wavelet Analysis" by Bruce et. al. appearing in IEEE Spectrum, October 1996 pages 26–35. For a discussion of the different applications of wavelets in computer graphics, reference is made to "Wavelets for Computer Graphics", I. Stollinitz et. al. published 1996 by Morgan Kaufmann Publishers, Inc.

It would be desirable to provide for a form of hardware embodiment of a decoder so as to provide for efficient and effective decoding of a series of wavelet coefficients previously encoded in order to substantially increase the speed of decoding.

ASPECTS OF INVENTION

It is an object of the present invention to ameliorate one or more disadvantages of the prior art.

According to one aspect of the invention there is provided an apparatus for decoding a stream of previously encoded coefficients including:

input means for receiving said stream of encoded coefficients;

bit plane level monitoring means connected to said input means and adapted to monitor a current bit plane level from said stream of coefficients;

pixel generation means interconnected to said input means and said bit plane level monitoring means and adapted to utilize said current bit plane level for generating output coefficient values each having a predetermined size.

According to another aspect of the invention there is provided a method of decoding a bitstream of previously encoded coefficients, the method including the following steps:

(i) inputting the bitstream of encoded coefficients;

(ii) determining a current bitplane level of bits within said stream; and (iii) generating output coefficient values each having a predetermined number of bits utilizing said current bitplane level and bit fragments within said bitstream.

According to another aspect of the invention there is provided an apparatus for decoding a bitstream of previously encoded coefficients, the apparatus including: input means for inputting the bitstream of encoded coefficients;

determination means for determining a current bitplane level of bits within said stream; and generation means for generating output coefficient values each having a predetermined number of bits utilizing said current bitplane level and bit fragments within said bitstream.

According to another aspect of the invention there is provided a computer program product including a computer readable medium having recorded thereon a computer program for decoding a bitstream of previously encoded coefficients, the computer program product including:

input means for inputting the bitstream of encoded coefficients;

determination means for determining a current bitplane level of bits within said stream; and generation means for generating output coefficient values each having a predetermined number of bits utilizing said current bitplane level and bit fragments within said bitstream.

BRIEF DESCRIPTION OF THE DRAWINGS

Embodiments of the invention are described with reference to the drawings, in which:

FIG. 14 illustrates a single level of the discrete wavelet transform process;

FIG. 15 illustrates a second level discrete wavelet transform;

FIG. 16 illustrates a full level discrete wavelet transform of an image;

FIGS. 17 and 17A illustrate the block encoding process of the preferred embodiment;

FIG. 18 illustrates one example of a 4×4 block as constructed in accordance with the preferred embodiment;

FIG. 20 illustrates the coefficient output process as implemented in the preferred embodiment;

DETAILED DESCRIPTION

Figure 1:
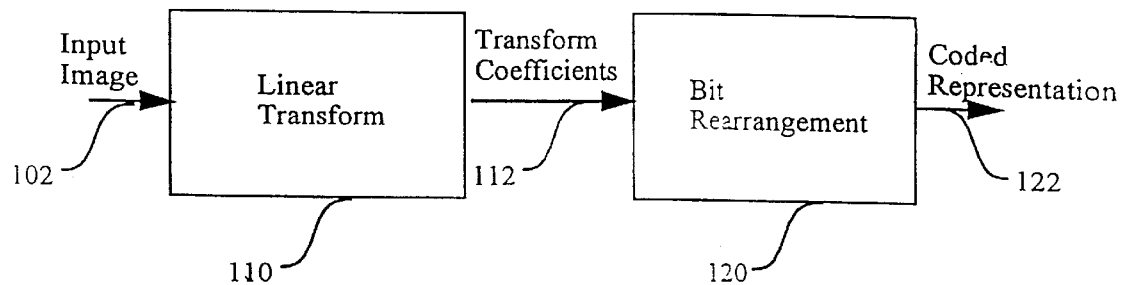
FIG. 1 is a high-level block diagram illustrating the image representation technique described in the herein-mentioned patent application.

Where reference is made in any one or more of the accompanying drawings to steps and/or features, which have the same reference numerals, those steps and/or features have for the purposes of this description the same function(s) and/or operation(s), unless the contrary intention appears.

Before proceeding with a description of the preferred embodiments, a description is given of the image compression and decompression method disclosed in Australian Provisional Patent Application No. PO 4728, entitled "A method for Digital Image Compression", filed on Jan. 22, 1997 by Canon Information Systems Research Australia Pty. Ltd. This method of compression and decompression is described in the following sections hereinafter entitled "1.0 Overview of SWEET Image Compression Method", "1.1 Encoding Process of First SWEET Image Compression Method", "1.2 Decoding Process of First SWEET Image Compression Method", "1.3 Two-Dimensional Example", and "1.4 Encoding Process of Second SWEET Image Compression Method".

1.0 Overview of SWEET Image Compression Method(s)

A high-level block diagram is illustrated in FIG. 1 to provide an overview of encoding method. An input image 102 is provided to the transform block 110, which is preferably a linear transform, to produce corresponding transform coefficients 112. A discrete wavelet transform (DWT) is preferably employed.

The two-dimensional DWT of an image is a transform that represents the image using a low frequency approximation to the image and three high frequency detail components. Conventionally, these components are termed sub-bands. Each of the four sub-images formed by the DWT is one quarter of the size of the original image. The low frequency image contains most of the information about the original image. This information, or energy compaction, is the feature of the discrete wavelet transform image subbands that is exploited for image compression.

The single-level DWT can be applied recursively to the low frequency image, or subband, an arbitrary number of times. For example, a three-level DWT of the image is obtained by applying the transform once and then applying the DWT to the low subband resulting from the transformation. Thus, this results in 9 detail subbands and one (very) low frequency subband. Even after three levels of DWTs, the resulting low frequency subband still contains a significant amount of information of the original image, yet is 64 times smaller (¼×¼×¼), thereby effecting a factor of 64 in compression.

However, other linear transformations for decorrelating image data may be practiced. For example, a discrete cosine transform (DCT) can be practiced. The transform coefficients 112, or more specifically the bit sequences representing their values, are then coded by the bit rearrangement block 120 in an efficient fashion to provide the coded representation 122.

The decoding process is simply the reverse of this encoding process. The encoded coefficients are decoded into the transform coefficients. The (transform domain) image is then inverse transformed to form the original image, or some approximation thereof.

Before proceeding with a further description of the embodiments, a brief review of terminology used hereinafter is provided. For a binary integer representation of a number, "bit n" or "bit number n" refers to the binary digit n places to the left of the least significant bit. For example, assuming an 8-bit binary representation, the decimal number 9 is represented as 00001001. In this number, bit 3 is equal to 1, while bits 2, 1, and 0 are equal to 0, 0, and 1, respectively. Furthermore, a transform may be represented as a matrix having coefficients arranged in rows and columns, with each coefficient represented by a bit sequence. Conceptually speaking the matrix may be regarded as having three dimensions; one dimension in the row direction; a second dimension in the column direction and a third dimension in the bit sequence direction. A plane in this three-dimensional space, which passes through each bit sequence at the same bitnumber, is called a bitplane or bit plane.

For transform coding applications, the number of bits per coefficient required to represent the possible range of coefficients is determined by the linear transform and the resolution of each pixel (in bits per pixel) in the input image. This range of values for each pixel is typically large relative to the values of most of the transform coefficients, and thus many coefficients have a large number of leading zeros. For example, the number 9 has four leading zeros in a 8-bit representation and has 12 leading zeros for a 16-bit representation. The compression method and apparatus represents (or codes) these leading zeros, for blocks of coefficients, in an efficient manner. The remaining bits and sign of the number are encoded directly without modification.

To simplify and the description, the transform coefficients are assumed hereinafter to be represented in an unsigned binary integer form, with a single sign bit. That is, the decimal numbers −9 and 9 are represented with the same bit sequence, namely 1001, with the former having a sign bit equal to 1 to indicate a negative value, and the latter having a sign bit equal to 0 to indicate a positive value. The number of leading zeros is determined by the range of the transform coefficients. In using an integer representation, the coefficients are implicitly already quantised to the nearest integer value, although this is not necessary. Further, for the purpose of compression, any information contained in fractional bits is normally ignored.

A region includes a set of contiguous image coefficients. The term coefficient is used hereinafter interchangeably with pixel, however, as will be well understood by a person skilled in the art, the former is typically used to refer to pixels in a transform domain (eg., a DWT domain).

1.1 Encoding Process of First SWEET Image Compression Method

Figure 3:
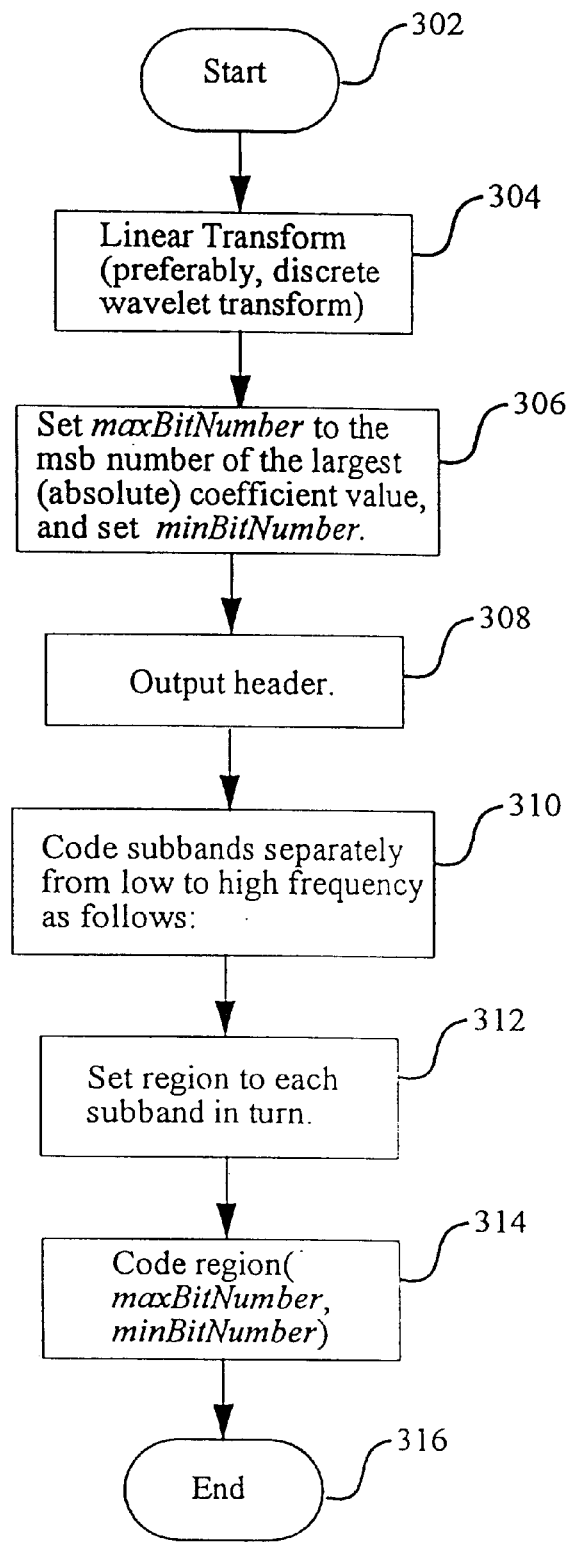
FIG. 3 is a flow diagram illustrating the method of representing, or encoding, an image described in the herein-mentioned patent application.
Figure 4:
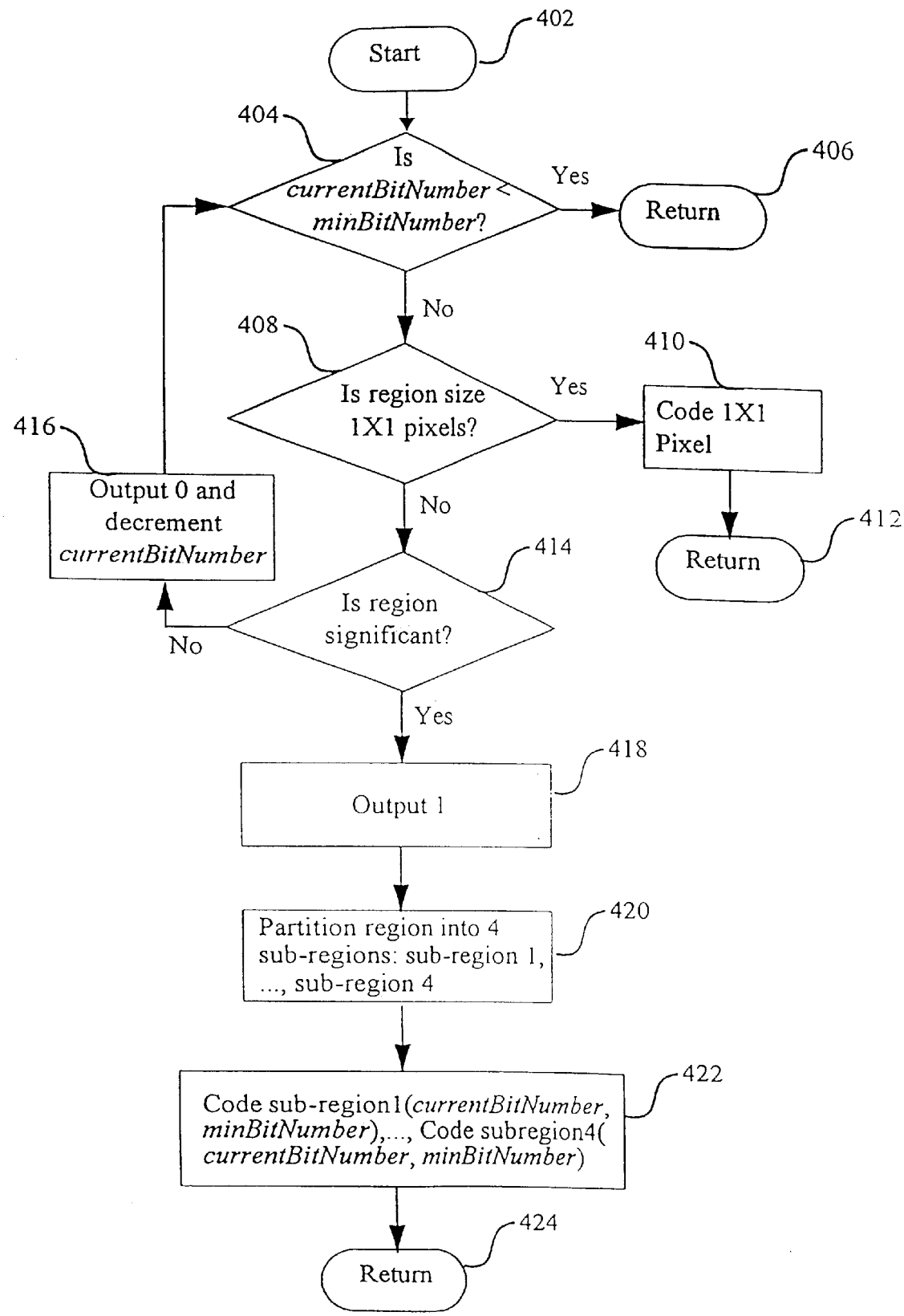
FIG. 4 is a detailed flow diagram illustrating the step of coding a region in FIG. 3.

A more detailed description of the first image compression method is provided with reference to FIGS. 3 and 4.

FIG. 3 is a flow diagram illustrating the first image encoding method. In step 302, processing commences using an input image. In step 304, the input image is transformed using a linear transformation, preferably a discrete wavelet transform. An initial region is defined to be the whole image. For example, in the case of a three-level DWT of the input image, the resulting coefficients consisting of the 10 subbands can be specified as the region. Alternatively each subband can be processed separately, setting each initial region to the whole subband in question.

In step 306, the most significant bit (msb) of the largest absolute value of the transform coefficients is determined and a parameter, maxBitNumber, is set to this coefficient value. For example, if the largest transform coefficient has a binary value of 00001001 (decimal 9), the parameter maxBitNumber is set to 3, since the msb is bit number 3. Alternatively, the parameter maxBitNumber may be set to be any value that is larger that the msb of the largest absolute value of the transform coefficients.

Further, in step 306, a coding parameter, minBitNumber is set to specify the coded image quality. In particular, this coding parameter specifies the precision of every coefficient in the transformed image and can be varied as required. For example, a minBitNumber of 3 provides a coarser reproduction of the original image than does a value of 1.

Optionally, the technique involves step 308, which provides an output header in the coded representation of the input image. Thus, in a practical implementation, header information is output as part of the coded representation. For example, the output header may contain information about the source image, including the image height and width, the number of levels of the DWT, the mean value of the DC subband, the maxBitNumber parameter, and the minBitNumber parameter.

Beginning in step 310, each subband of the transformed image is coded separately in steps 312 and 314. Each subband is coded independently, in order from low frequency to high frequency. For the DC subband, the mean value is removed prior to coding and coded into the header information in step 308. In step 312, each subband is coded by setting an initial region as the whole subband. In step 314, the region is encoded with the maxBitNumber and minBitNumber as parameters. This provides a hierarchical code, since lower resolution versions of the image are coded into the bit stream before higher resolutions. Processing terminates in step 316.

FIG. 4 is a detailed flow diagram of the procedure "Code region(currentBitNumber, minBitNumber)" called in step 314 of FIG. 3 for coding each region, where maxBitNumber is provided as the currentBitNumber. In step 402, processing commences. The inputs to the region coding process of FIG. 4 include the currentBitNumber and minBitNumber parameters. Preferably, the method is implemented as a recursive technique where the process is able to call itself with a selected region or sub-region. However, the process may implemented in a non-recursive manner.

In decision block 404, a check is made to determine if the currentBitNumber parameter is less than the minBitNumber parameter. Otherwise, if decision block 404 returns true (yes), nothing is done and processing returns to the calling procedure in step 406. This condition indicates that every coefficient in the selected region has a msb number less than minBitNumber. If decision block 404 returns false (no), processing continues at decision block 408.

In decision block 408, a check is made to determine if the selected region is a 1×1 pixel. If decision block 408 returns true (yes), processing continues at step 410. In step 410, the 1×1 pixel is coded. Preferably, this involves directly outputting the remaining bits above the minBitNumber in the coded representation. In step 412, processing returns to the calling procedure. Otherwise, if decision block 408 returns false (no), the region consists of more than one coefficient and processing continues at decision block 414.

In decision block 414, the selected region is checked to determine if it is significant. That is, the significance of the region is tested. The region is said to be insignificant if the msb number of each coefficient in the region is less than the value of the currentBitNumber parameter. To make the concept of region significance precise, a mathematical definition is given in Equation (1). At a given bit number, say currentBitNumber=n, the region is said to be insignificant if:

$$|c_{ij}|<2^n, \forall i,j \in R, \tag{1}$$

where R denotes the region, and $c_{ij}$ denotes coefficient (i,j) in this region.

If decision block 414 returns false (no), processing continues at step 416. In step 416, a value of 0 (or first token) is output in the coded representation stream, and the currentBitNumber parameter is decremented by 1. That is, the next, lower bitplane of the region is selected for processing. Processing then continues at decision block 404, where the region is again processed with the parameters currentBitNumber−1 and minBitNumber. Otherwise, if decision block 414 returns true (yes), that is, the region is significant, processing continues at step 418.

In step 418, a value of 1 (or second token) is output in the coded representation stream. In step 420, the selected region is partitioned into a predetermined number (preferably, 4) of subregions using a specified partitioning algorithm. The partitioning algorithm used is known to the decoder.

Figure 2:
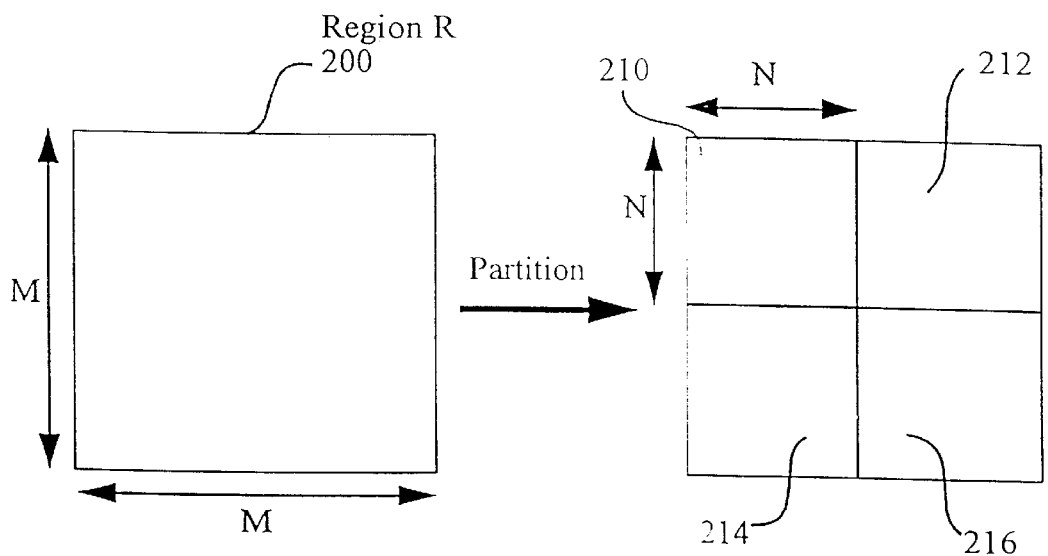
FIG. 2 is a diagram illustrating partitioning described in the herein-mentioned patent application.

In this method, square regions are used. A region is partitioned preferably into 4 equal-sized (square) subregions. As shown in FIG. 2, the selected region (R) 200 has a size of M×M coefficients and is partitioned into four equal-sized subregions 210, 212, 214 and 216. Each of the subregions has a size of N×N, where N is equal to M/2. This is not always possible depending on the size and shape of the initial region. If this is not possible, the initial region can be partitioned into a number of square regions, each having dimensions that are a power of 2, and encode these partitions separately. In any case, this initialization has minimal effect on the overall results if done in an intelligent fashion. Alternatively, a different partition may be used that is suitable for a block-based coder.

In step 422, each subregion is then coded with the same currentBitNumber and minBitNumber parameters. This is preferably done by means of a recursive call to the procedure "Code region(currentBitNumber, minBitNumber)" of FIG. 4. This coding of subregions may be implemented in parallel or sequentially. In the latter case, the processing may commence from a low frequency subband to higher frequency subbands in turn.

In the coded representation, a transform coefficient is coded by simply outputting the pixel bits from the currentBitNumber to the minBitNumber. Preferably, a convention is followed whereby the sign is output only if some of the coefficient bits were non-zero. For example, if currentBitNumber=3, minBitNumber=1, then −9 (00001001) is coded as "1 0 0" followed by a sign bit "1".

1.2 Decoding Process of First SWEET Image Compression Method

Figure 5:
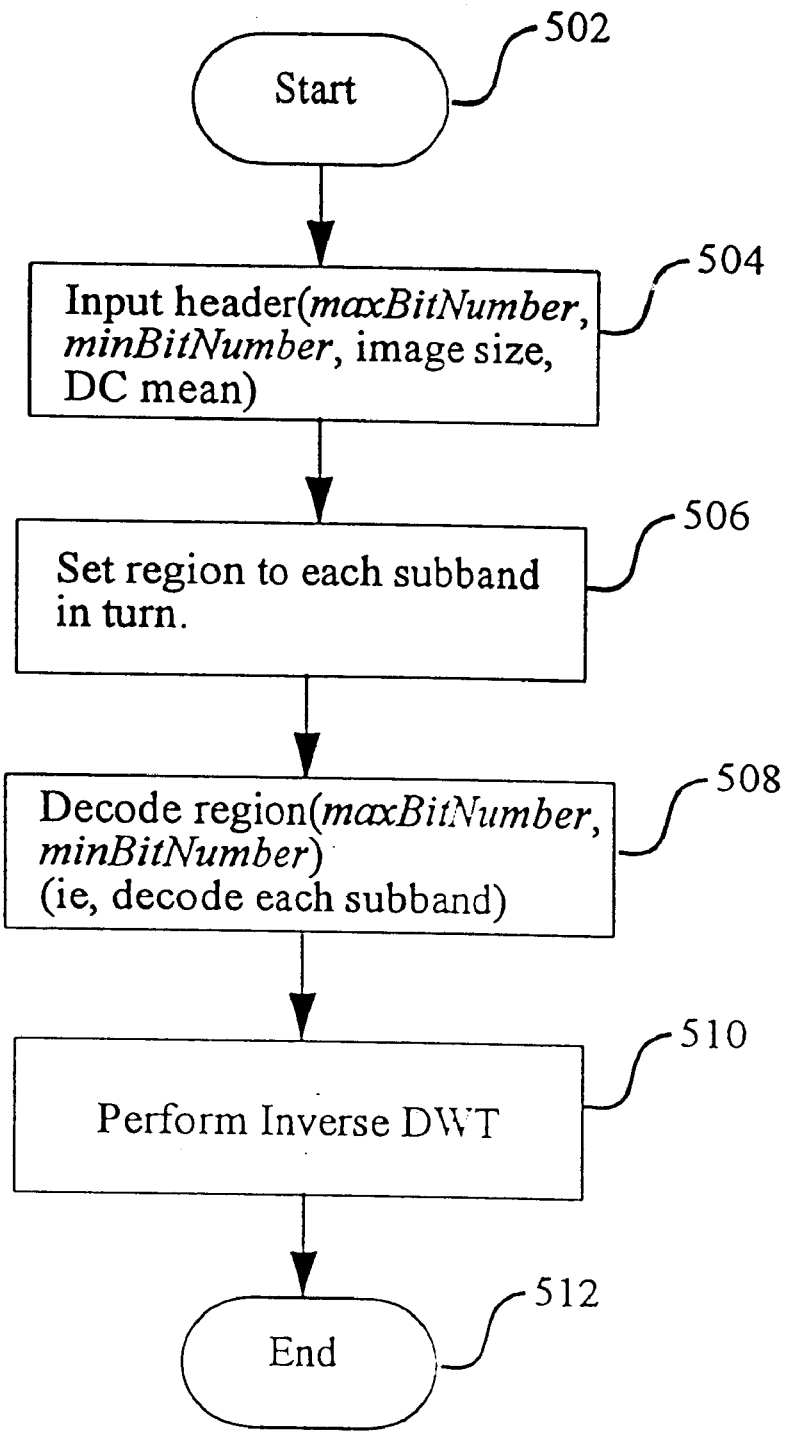
FIG. 5 is a flow diagram illustrating the method of decoding a coded representation of an image produced in accordance with the method FIG. 3.

FIG. 5 is a flow diagram illustrating a method of decoding the coded representation of an image obtained using the process of FIGS. 3 and 4. In step 502, processing commences using the coded representation. In step 504, the header information is read from the coded representation to determine the size of the original image, and hence the initial region size. Also, information such as maxBitNumber (equal to the initial currentBitNumber in the coding process) and minBitNumber are input. Further information includes the mean value of the DC subband.

In step 506, decoding of each subband is commenced by setting the region to the respective subbands in turn. In step 508, the selected region is decoded using the maxBitNumber and minBitNumber parameters. In step 510, the inverse DWT is applied to the decoded selected region. Processing terminates in step 512.

Figure 6:
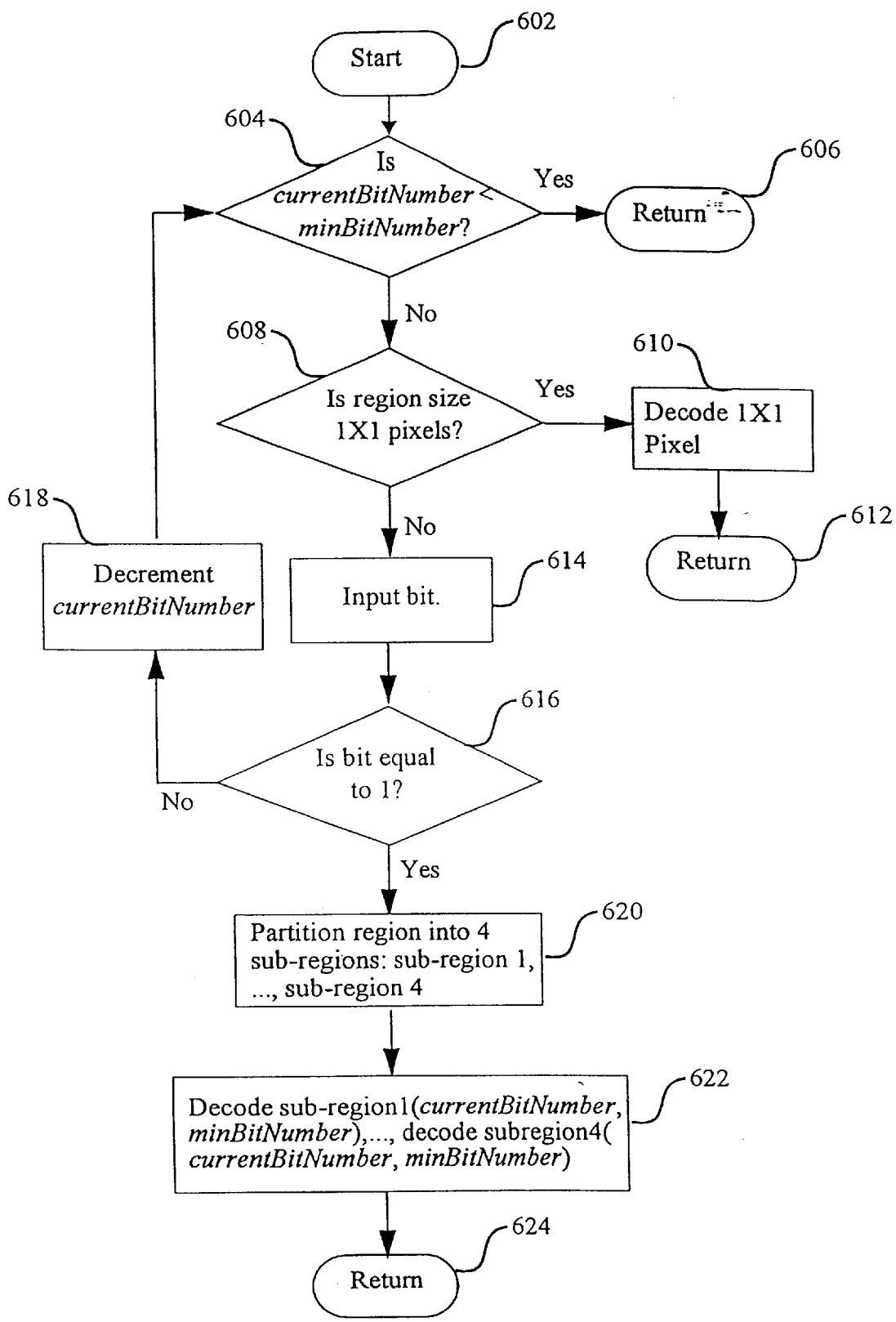
FIG. 6 is a detailed flow diagram illustrating the step of decoding a region in FIG. 5.

FIG. 6 is a detailed flow diagram of step 508 of FIG. 5 for decoding each region using procedure call "Decode region (currentBitNumber, minBitNumber)", where maxBitNumber is provided as the currentBitNumber. In step 602, processing commences. The inputs to the region decoding process of FIG. 6 are the currentBitNumber and minBitNumber parameters. Again, the method is preferably implemented as a recursive technique. However, the process can be implemented in a non-recursive manner.

In decision block 604, a check is made to determine if the currentBitNumber is less than the minBitNumber. If decision block 604 returns true (yes), processing continues at step 606, where processing returns to the calling procedure. Otherwise, if decision block 604 returns false (no), processing continues at decision block 608.

In decision block 608, a check is made to determine if the selected region has a size of 1×1 pixels. If decision block 608 returns true (yes), processing continues at step 610. In step 610, the 1×1 region is decoded. Processing then returns to the calling procedure in step 612. If decision block 608 returns false (no), processing continues at step 614. In step 614, a bit is input from the coded representation.

In decision block 616, a check is made to determine if the bit is equal to 1, that is, the input is checked to determine if the region is significant. If decision block 616 returns false (no), processing continues at step 618. In step 618, the currentBitNumber is decremented, and processing continues at decision block 604. Otherwise, if decision block 616 returns true (yes), processing continues at step 620. In step 620, the region is partitioned into the predetermined number (preferably, 4) of sub-regions. In step 622, each of the sub-regions is decoded using the currentBitNumber and minBitNumber. This is carried out by means of a recursive call to the process illustrated in FIG. 6. In step 624, processing returns to the calling procedure.

Thus, the bits output from the significance decisions in the encoder instruct the decoder on which path of the algorithm to take, thus mimicking the encoder. The pixels, and possible sign, are decoded by simply reading in the appropriate number of bits (currentBitNumber to minBitNumber and if some of these are non-zero the sign bit).

1.3 Two-Dimensional Example

The method effectively codes the leading zeros of most transform coefficients, while coding the bits from the most significant bit to the predetermined least significant bit, specified by the parameter minBitNumber, and the sign simply as is. Thus, the compression method advantageously represents the leading zeros. This method is very efficient in certain situations, namely for coding discrete wavelet transform image coefficients, which typically exhibit a large dynamic range. A few coefficients typically have very large values, while most have very small values.

Figures 7A, 7B, 7C, 7D:
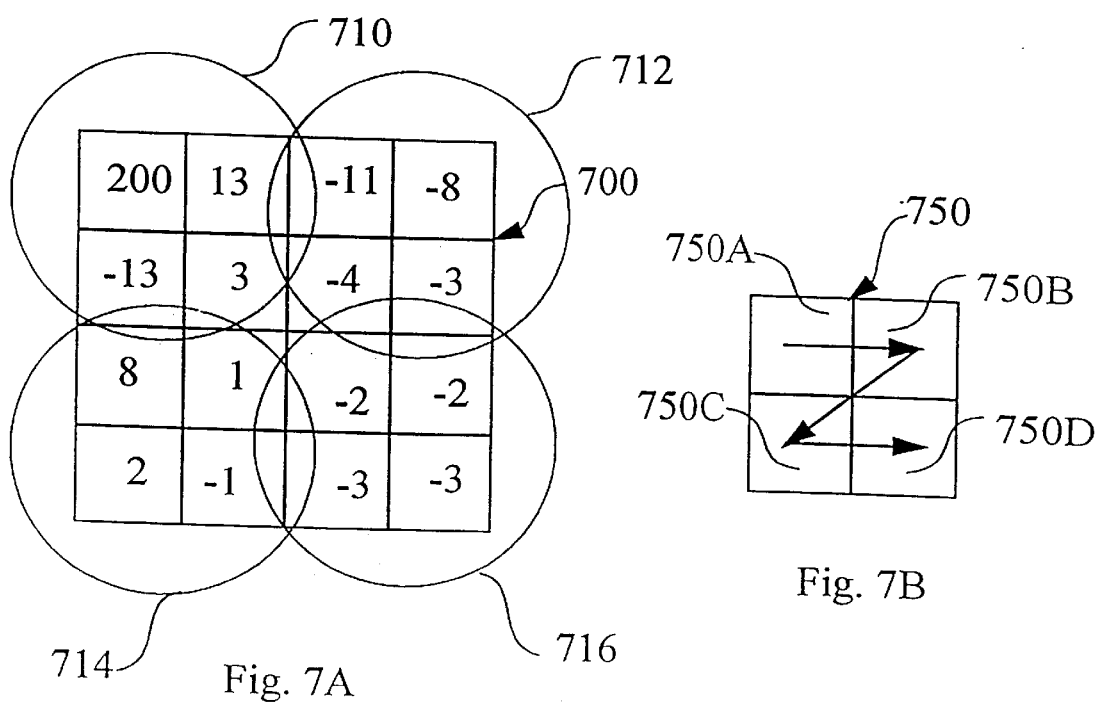
FIGS. 7A to 7D are diagrams illustrating the processing of a two-dimensional, eight-coefficient region in accordance with the encoding and decoding method of FIGS. 3 to 6.

An example of encoding a two-dimensional region including 4×4 coefficients is described with reference to FIGS. 7A to 7D. The processing of the 4×4 region 700 of FIG. 7A is commenced with the maxBitNumber set to 7 since this is the largest bit number (bitplane) of all of the coefficients:

$$\begin{bmatrix} 200 & 13 & -11 & -8 \\ -13 & 3 & -4 & -3 \\ 8 & 1 & -2 & -2 \\ 2 & -1 & -3 & -3 \end{bmatrix}.$$

The minBitNumber is set to 3, for illustrative purposes. A header is preferably output in the coded representation containing the maxBitNumber and minBitNumber. The process of coding the region 700 then follows.

At currentBitNumber=7, a one (1) is output since the region 700 is significant with respect to bit number 7 (see decision block 404, 408, and 414 and step 418 of FIG. 4). The region 700 is then partitioned into four sub-regions (see step 420 of FIG. 4): the top left region 710, the top right region 712, the bottom left region 714 and the bottom right region 716 of FIG. 7A. Each of the subregions consist of 2×2 coefficients.

The sub-regions 710, 712, 714 and 716 of FIG. 7A are in turn coded in the predefined processing sequence shown of FIG. 7B, where a region 750 consists of four sub-regions 750A to 750D. The three arrows illustrated in the diagram indicate the order or sequence of processing, that is, top left sub-region 750A, top right sub-region 750B, bottom left sub-region 750C, and bottom right sub-region 750D, respectively.

The sub-region 710 of FIG. 7A is coded first (see step 422 of FIG. 4). For the currentBitNumber equal to 7, a one (1) is output in the coded representation. The sub-region 710 is then partitioned into four 1×1 pixels having decimal values 200, 13, -13 and 3. Each of these coefficients is coded by outputting the bits of each coefficient from the currentBitNumber=7 to the minBitNumber=3 (see decision block 408 and step 410 of FIG. 4). A sign bit is then output if required. Thus, the decimal value is 200 is coded as 11001 followed by the sign bit 0. The coefficient value 13 is coded as 00001 with a sign bit 0. The coefficient value -13 is coded as 00001 with a sign bit 1. Finally, the coefficient value 3 is coded as 00000 (without a sign bit). The coded representation of each coefficient includes the two "1" bits preceding the bits of coefficients "200" between the currentBitNumber and minBitNumber. This completes the coding of the top left sub-region 710. The coded output at this state is:

$$1 1 \underbrace{11001}_{200} \overset{\text{sign bit}}{0} \underbrace{00001}_{13} \underbrace{000001}_{-13} \underbrace{00000}_{3}.$$

The header information is not shown in the foregoing expression.

The top right sub-region 712 is then coded (per FIG. 7B). A zero (0) is output for each of currentBitNumber equal to 7, 6, 5, and 4, since the region 712 is insignificant with respect to these bit numbers. A one (1) is output at currentBitNumber=3, since this bitplane is significant with respect to bit number 3. The sub-region 712 is partitioned into the four 1×1 pixels having values -11, -8, -4 and -3. These decimal values are coded as bit value 1 with sign bit 1, bit value 1 with sign bit 1 and bit values 0 and 0 without sign bits, respectively. Thus, at this stage, the coded representation is as follows:

11110010000010000011000000001 <u>11</u> <u>11</u> <u>0</u> <u>0</u>
                                                                                          −11 −8 −4 −3

The bottom left sub-region 714 is then encoded. A zero (0) is output for each of currentBitNumber equal to 7, 6, 5, and 4, since the region 714 is insignificant with respect to these bit numbers. A one (1) is output at currentBitNumber equal to 3, since this bitplane is significant with respect to bit number 3. The sub-region 714 is then partitioned into four 1×1 pixels having values 8, 1, 2 and −1. These are coded respectively as binary value 1 with sign bit 0, and binary values 0,0 and 0 without sign bits.

Finally, the bottom right sub-region 716 having values −2, −2, −3, and −3 is coded. A zero (0) is output for each of currentBitNumber=7, 6, 5, 4 and 3 since the sub-region 716 is insignificant with respect to these bit numbers. No sign bits are output. Thus, the coded representation is as follows:

11110010000010000011000000001111100000011000000000.

The decoder simply mimics the encoding process to reconstruct the region from the coded representation as depicted in FIG. 7C.

The decoding process can be made "smarter" in a number of ways. One such a "smarter" way is depicted in FIG. 7D. In this case, the magnitude of the non-zero coefficients is each increased by half of 2 to the power of minBitNumber. This is depicted in FIG. 7D. In this manner, the "smart" decoding processing generally reduces the mean square error between the decoded and the original coefficients. Still further, the encoder can alternatively perform this (type of) operation, thereby leaving the decoder to use the simplest depicted in FIG. 7C.

1.4 Encoding Process of Second SWEET Image Compression Method

A coding process according to an alternate method is hereinafter described with reference to FIGS. 9 to 12.

A discrete wavelet transform of an entire digital image can be performed on a block-by-block basis. The result of the transformation upon each block is a set of coefficients, which are essentially equivalent to a set of spatially corresponding coefficients of a discrete wavelet transform of the entire image. For example, from a predetermined set of coefficients of a DWT for an entire image, a portion or block of the digital image can be reproduced to a specified detail. Selecting the predetermined set of coefficients from the frequency domain amounts substantially to representing the corresponding portion of a digital image (the block) from the spatial domain. A block based DWT of a digital image can be performed by decomposing an image into a plurality of blocks and applying the transform to each block independently, thereby substantially evaluating those DWT coefficients relevant to the current spatial location. The advantage of adopting a block-based transform approach is that a block can be subsequently encoded with minimal interaction (substantially independent) from another block of the image. Block-based techniques are inherently memory localized and therefore are generally efficient when implemented using computer systems.

Figure 9:
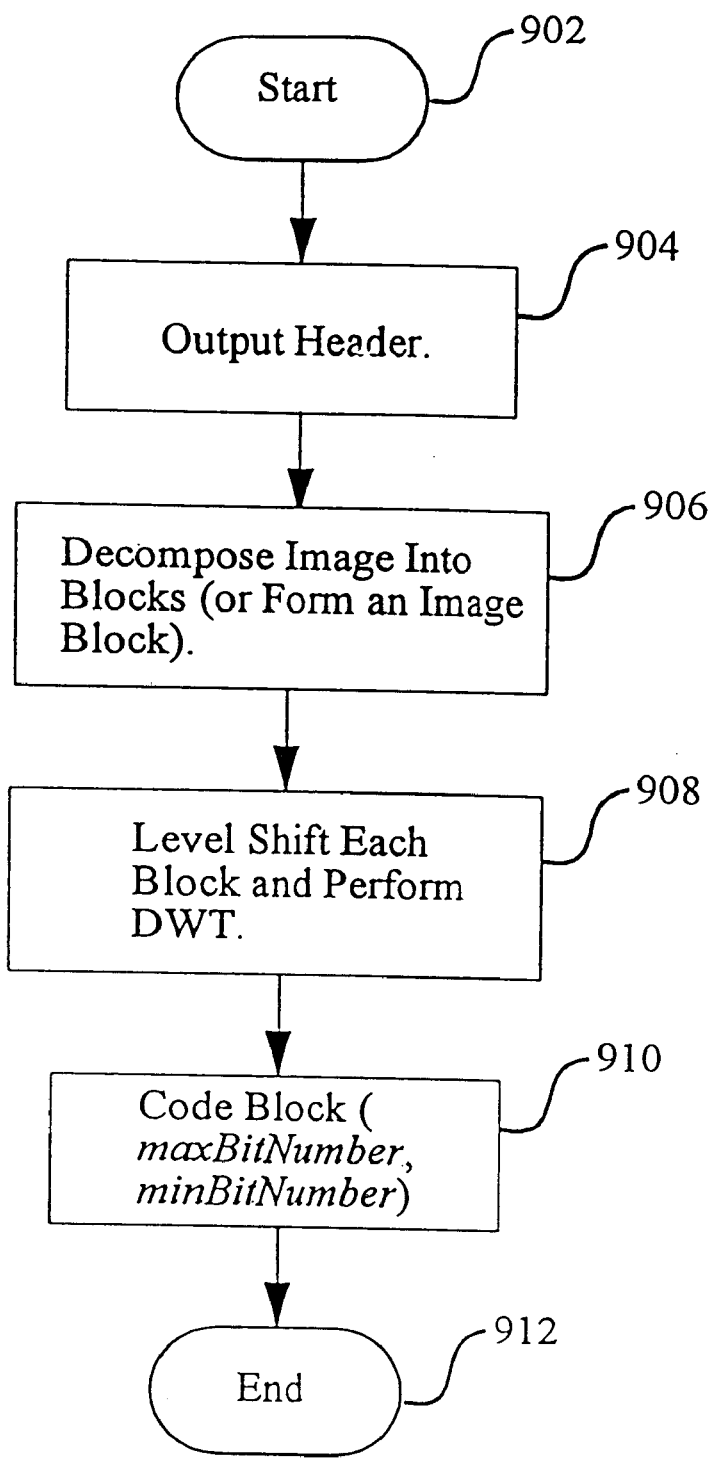
FIGS. 9 to 12 are flow diagrams illustrating an alternate method representing, or encoding, an image described in the herein-mentioned patent application.

FIG. 9 is a flow diagram illustrating the block-based encoding process according to the second encoding method. Processing commences at step 902. In step 904, a header is output. This information preferably includes the image height and width, the block size, the number of levels of the DWT, and two coding parameters maxBitNumber and minBitNumber. Optionally, more or less header information may be used depending upon the application.

The coding parameter maxBitNumber can be selected in a variety of ways. If the block DWT is performed on all image blocks prior to coding of any of them, the maxBitNumber can be chosen to be the MSB number of the largest coefficient across all DWT blocks. For example, if the largest coefficient is 10000001 (decimal value 129), the maxBitNumber is set to 7 since the MSB is bit number 7. Alternatively, a deterministic bound can be used which is determined by the transform and the resolution of the input image. For example, with an 8-bit input image (level shifted to 7-bits plus sign) and the Haar transform, the largest MSB is bounded by J+7 where J is the number of levels of the DWT. If the blocks are small, the selection of this parameter can have a significant effect on compression. In some instances, more sophisticated ways of selecting maxBitNumber may be employed. However, this depends upon the specific application.

The parameter minBitNumber determines the compression ratio versus quality trade off and can be varied. For example, for nearly orthogonal transforms, a value of 3 provides adequate image quality for 8-bit, grey-scale or 24-bit, RGB images.

In step 906, the image is decomposed into blocks (or an image block is formed). The image is decomposed preferably into overlapping blocks. However, non-overlapping blocks may be employed. The block of coefficients can be as large as the whole original image, or as small as a block of 8×8 coefficients (for a three-level transform). For low memory applications, a block that is as small as possible may be employed. Generally, a block size of 16 coefficients is sufficient for higher levels of compression with a three or four level DWT. A block size of 8×8 coefficients with a three-level DWT can maintain good coding efficiency by employing differential pulse code modulation (DPCM) on the DC coefficient of each block.

In step 908, each block is level shifted and the transform is performed. Preferably, a DWT is employed. The image values are level shifted (for example, by 128 for an 8-bit image) to reduce or eliminate any undue mean bias, and each spatial block of the image is transformed. For a DWT, usually some knowledge of the block surrounding the current block is needed (and similarly for the inverse DWT), although this is not strictly required.

In step 910, the block is coded using the maxBitNumber and minBitNumber parameters. Processing terminates in step 912.

Figure 10:
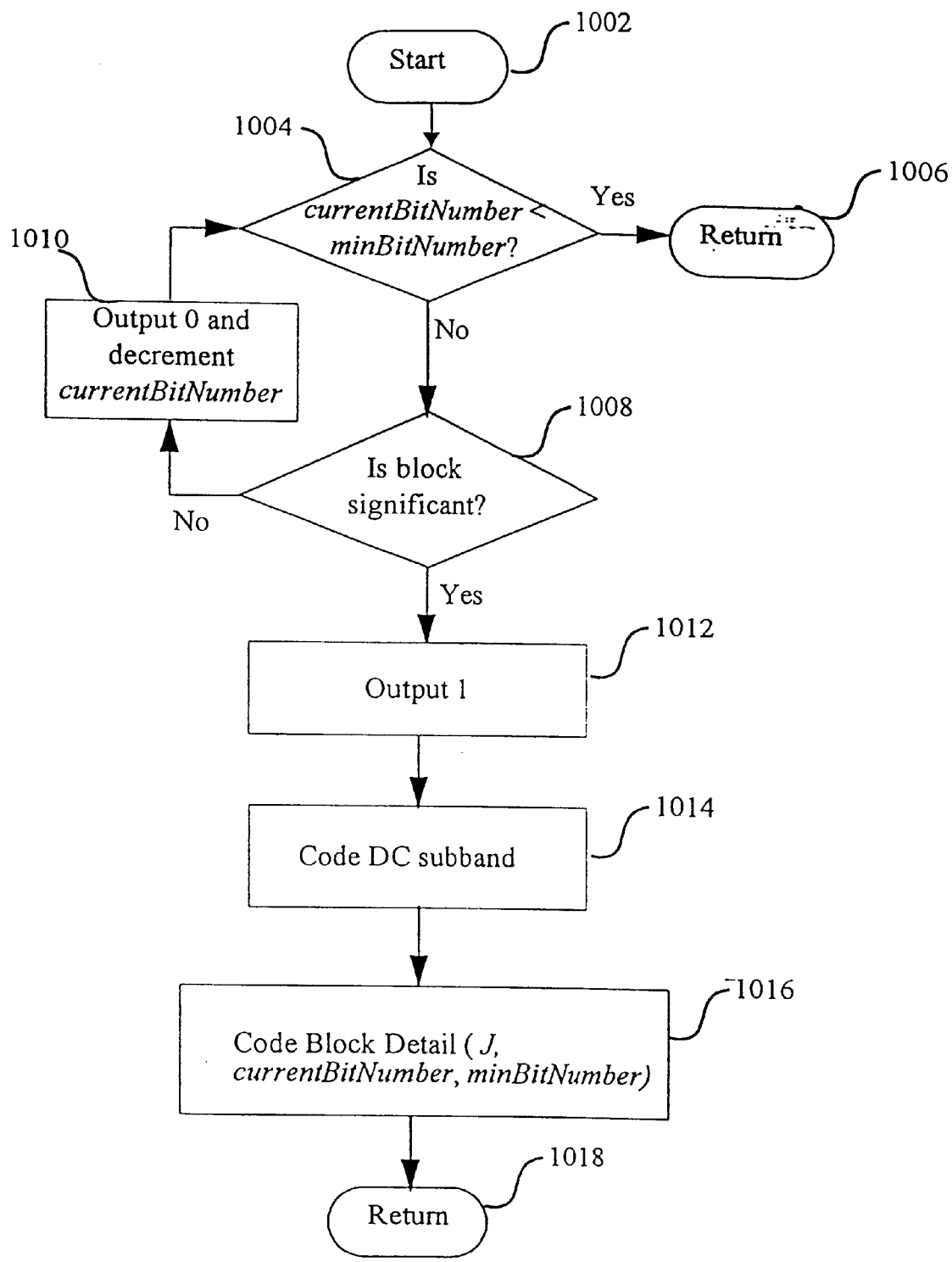

Step 910 for coding a block is illustrated in detail in the flow diagram of FIG. 10. The inputs to the block coding process of FIG. 10 include the currentBitNumber and the minBitNumber parameters. With reference to step 910 of FIG. 9, the maxBitNumber is input as the currentBitNumber parameter. Processing commences in step 1002. In decision block 1004, a check is made to determine if the currentBitNumber is less than the minBitNumber. If decision block 1004 returns true (yes), processing continues at step 1006. In step 1006, execution returns to the calling process, thereby indicating that every coefficient in the block has an MSB number less than the minBitNumber. Otherwise, if decision block 1004 returns false (no), processing continues at decision block 1008.

In decision block 1008, a check is made to determine if a current block is significant. If decision block 1008 returns false (no), processing continues at step 1010. In step 1010, a zero (0) is output in the coded representation and the currentBitNumber is decremented, that is, the next lower bit plane is selected. Processing then continues at decision block 1004. Otherwise, if decision block 1008 returns true (yes) processing continues at step 1012.

Decision blocks 1004 and 1008 along with step 1010 enable the process to find the MSB number of the largest coefficient in the block. A block is insignificant with respect to the currentBitNumber if the MSB number of every coefficient in the block is less than the currentBitNumber. This is repeated until the bitplane of the block is significant or the currentBitNumber is less than the minBitNumber.

In step 1012, a one (1) is output in the coded representation to indicate the bitplane is significant. In step 1014, the DC subband is coded. In step 1016, the block detail is coded using the parameters J, currentBitNumber and minBitNumber. In step 1018, execution returns to the calling procedure. Thus, given that the block is significant, steps 1012, 1014 and 1016 are carried out to use the (generalized) quadtree segmentation to find all coefficients with an MSB number greater than the minBitNumber. If the block is significant, it is partitioned into two "sub-blocks": the DC subband coefficients and the block consisting of the remaining coefficients, referred to as the "block detail" for level J since it represents the high frequency information about the block of level J at all lower levels.

Figure 12:
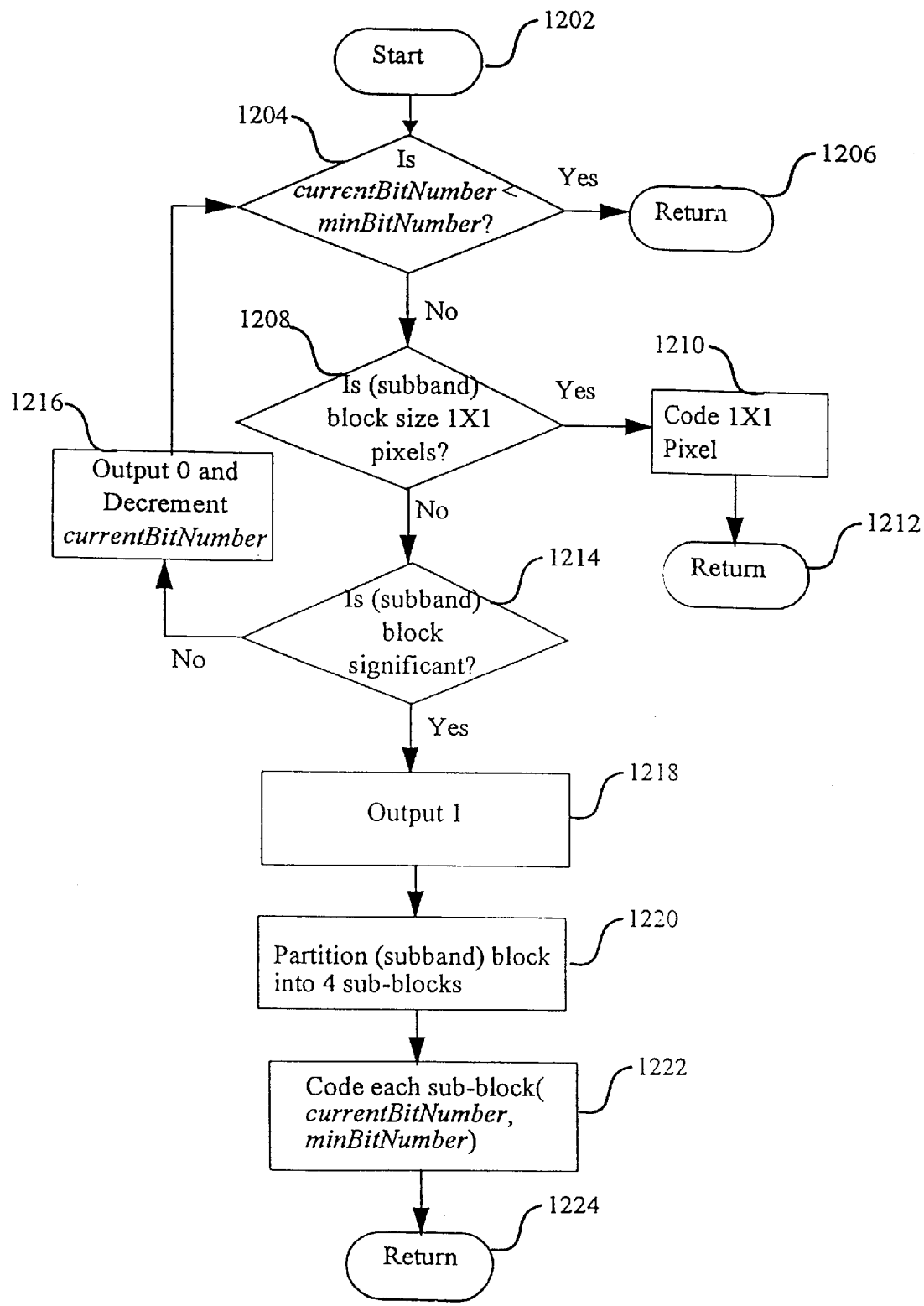

Step 1014 of FIG. 10 for coding the DC subband is illustrated in detail by the flow diagram of FIG. 12. That is, FIG. 12 shows the process of coding a subband or sub-block using currentBitNumber and minBitNumber parameters. In step 1202, processing commences. In decision block 1204, a check is made to determine if the currentBitNumber is less than the minBitNumber. If decision block 1204 returns true (yes), processing continues at step 1206. In step 1206, execution returns to the calling procedure. Otherwise, if decision block 1204 returns false (no), processing continues at decision block 1208.

In decision block 1208 a check is made to determine if the (subband) block size is 1×1 pixels. If decision block 1208 returns true (yes), processing continues at step 1210. In step 1210, the 1×1 pixel is coded. This involves outputting the bits between the currentBitNumber and the minBitNumber, inclusive, followed by a sign bit if necessary. Processing then returns to the calling procedure in step 1212. Otherwise, if decision block 1208 returns false (no), processing continues at decision block 1214.

In decision block 1214, a check is made to determine if the (subband) block is significant. If decision block 1214 returns false (no), processing continues at step 1216. In step 1216, a zero (0) is output in the coded representation and the currentBitNumber is decremented. Processing then continues at decision block 1204. Otherwise, if decision block 1214 returns true (yes), processing continues at step 1218.

In step 1218, a one (1) is output in the coded representation to indicate that the (subband) block is significant. In step 1220, the (subband) block is partitioned into four sub-blocks. In step 1222, each sub-block is coded using the parameters currentBitNumber and minBitNumber, by means of a recursive call to the process of FIG. 12. In step 1224, execution returns the calling procedure.

Thus, in the process of FIG. 12, a subband or sub-block thereof is coded. The largest MSB number is isolated as before. If the sub-block consists of only one pixel, it is coded as a single coefficient. Otherwise, the currentBitNumber is decremented and a zero (0) is output in the coded representation until the currentBitNumber is less than the minBitNumber, or the subband (sub-block) is significant. If the subband (sub-block) is significant, it is partitioned into four (as close to equal as possible) sub-block, and these are coded in turn. A single coefficient, for example the DC coefficient, is encoded by outputting the coefficient bits from the currentBitNumber to the minBitNumber. Again, the sign is preferably only output if some of the coefficient bits are non-zero.

Figure 11:
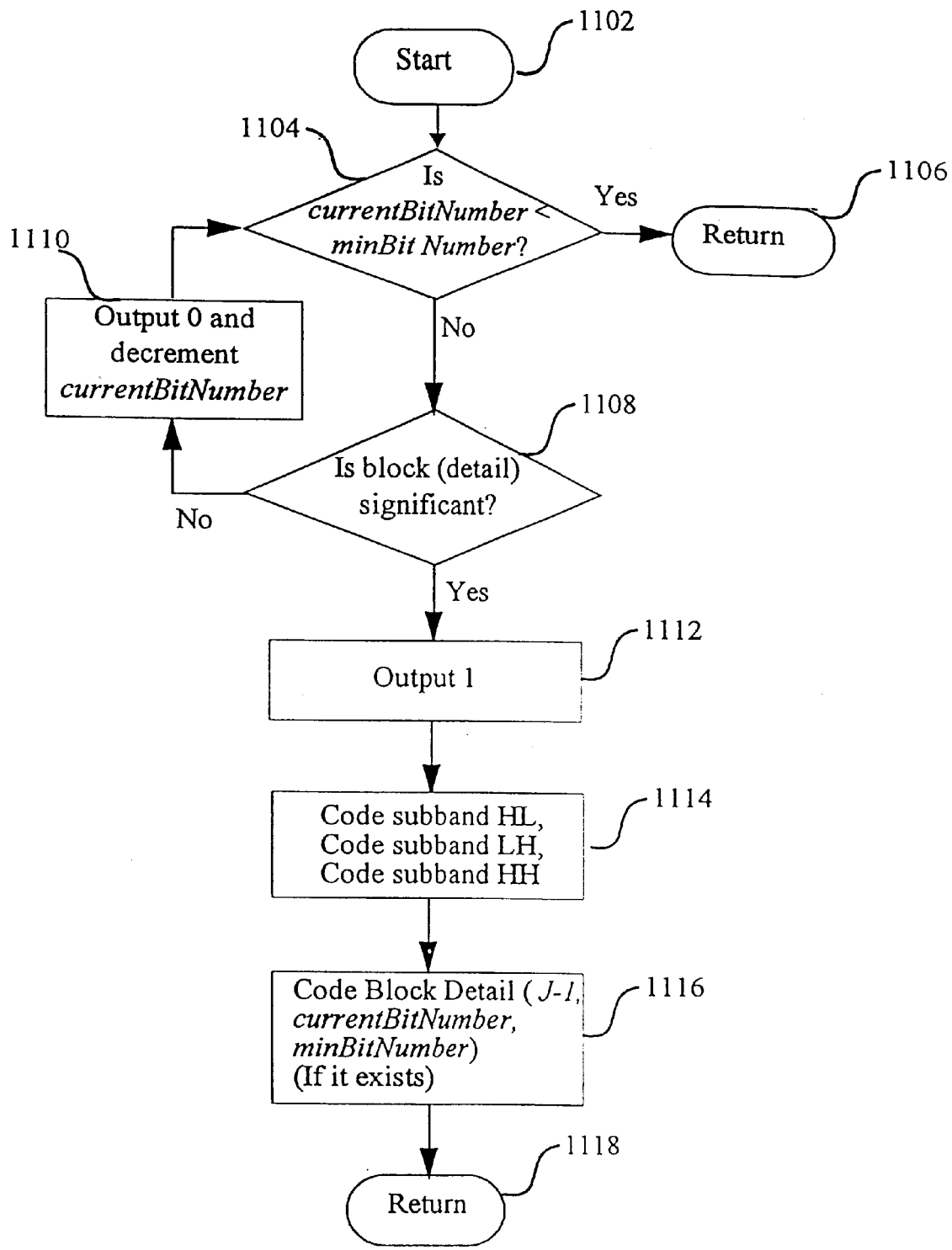

Step 1016 of FIG. 10 for coding block detail is illustrated by the flow diagram of FIG. 11. In step 1102, processing commences. In decision block 1104, a check is made to determine if the currentBitNumber is less than the minBitNumber. If decision block 1104 returns true (yes), execution returns to the calling procedure in step 1106. Otherwise, if decision block 1104 returns false (no), processing continues at decision block 1108.

In decision block 1108, a check is made to determine if the block (detail) is significant. If decision block 1108 returns false (no), processing continues at step 1110. In step 1110, a zero (0) is output in the coded representation and the currentBitNumber is decremented. Processing then continues at decision block 1104. Otherwise, if decision block 1108 returns true (yes), processing continues at step 1112.

In step 1112, a one (1) is output in the coded representation to indicate that the block (detail) is significant. In step 1114, each of the high-low (HL), low-high (LH), and high-high (HH) frequency subbands is coded. The HL, LH, and HH frequency subbands of each resolution are commonly referred to as AC subbands. Each of these subbands is coded in accordance with the process of FIG. 12. In step 1116, the block detail is coded using the parameters J-1, currentBitNumber and minBitNumber (if the block detail exists) by means of a recursive call to the process illustrated in FIG. 11. Execution returns to the calling procedure in step 1118.

Thus, the block detail for level J is processed to first isolate the MSB number of the largest coefficient. This is done by decrementing the currentBitNumber and outputting zeros until the block is significant. The block is then partitioned into the three high frequency subbands at level J and the block detail for level J-1 (if J-1 is greater than 0). This partitioning approach is motivated by the so-called 1/f type spectral models.

The decoding process for the second method can be implemented by mimicking the coding process described with reference to FIGS. 9 to 12.

The encoding and decoding methods and apparatuses represent digital image data in an efficient and flexible manner, in which the representation is suitable for storing and/or transmitting images. The encoding techniques can be used generally to represent an array of transform coefficients, and to provide an efficient representation by representing an image in the discrete wavelet transform domain. In particular, the methods and apparatuses represent (or code) leading zeros of blocks of transform coefficients obtained from an input image. The techniques are efficient in terms of offering a good reproduction of the original image for a given size code and offering fast decoding. Further, the techniques are flexible in that coefficients obtained from a linear transformation are encoded independently without the use of entropy coding. The advantageous aspects of the methods include the depth first nature of the coding. Further, in the case of coding subbands, the advantageous aspects of the method include hierarchical coding of each subband separately.

2.0 Preferred Embodiment(s) of Apparatus and Method

Figure 13A:
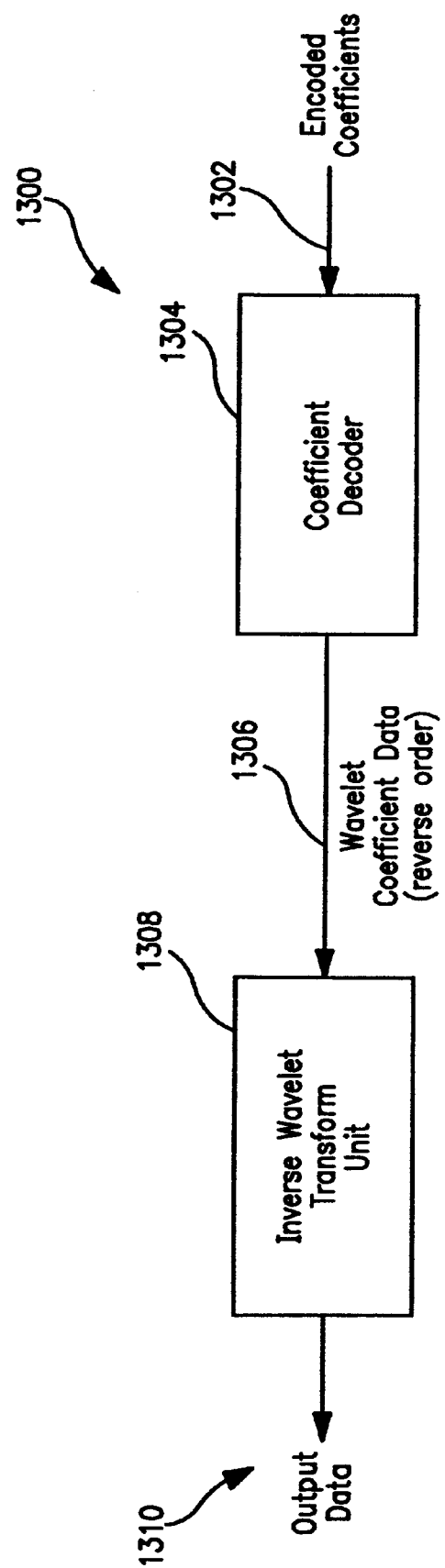
FIG. 13A illustrates a form of wavelet transform coefficient decoder.

Turning initially to FIG. 13A, there is illustrated a decoder arrangement 1300 of the preferred embodiment. The output data 1310 of the decoder will be a close approximation of the original input data. The output data 1310 is a result of inverse wavelet transforming 1308 a series of wavelet coefficients 1306 which are input from a coefficients decoder 1304. The wavelet coefficients 1306 are obtained from the decoder 1304 by decoding the encoded coefficients 1302.

Figure 13B:
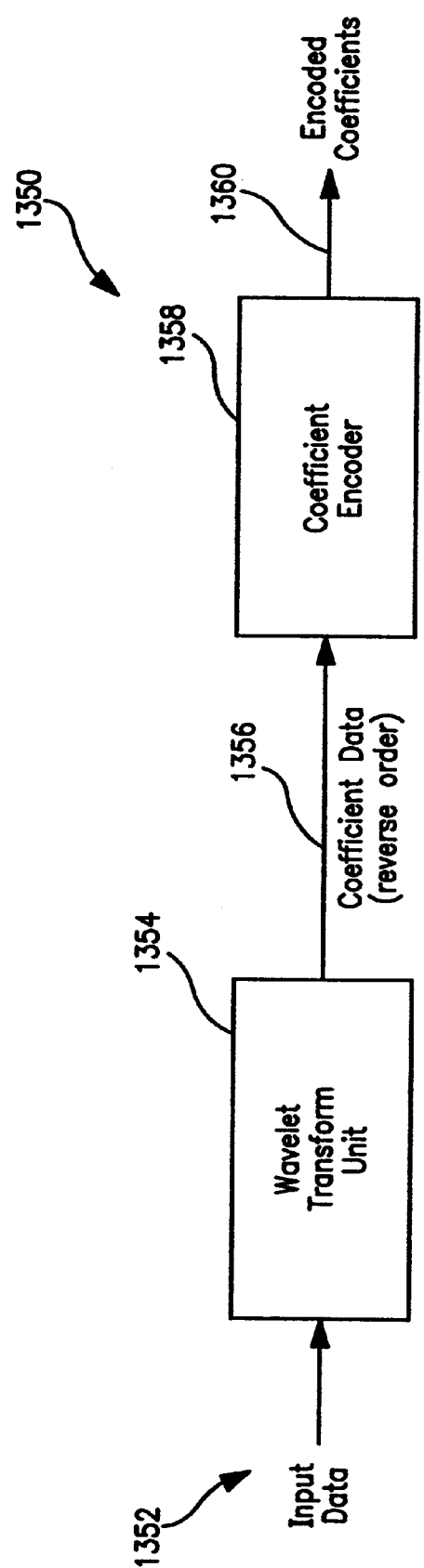
FIG. 13B illustrates a form of wavelet transform coefficient encoder.

The decoder arrangement 1300 includes a standard inverse wavelet unit 1308 and a coefficient decoder 1304 in accordance with the preferred embodiment. As the decoding process mimics the encoding process, the corresponding encoding process will now be described in order to fully comprehend the operation of the coefficients decoder 1300. Such an encoder is illustrated in FIG. 13B, which involves the inverse of the arrangement shown in FIG. 13A. An example of the encoding process will be described hereinafter.

A description of the wavelet transform process is given in many standard texts and in particular the aforementioned book by Stollnitz et. al. In order to assist in obtaining a proper understanding of operation of the decoder preferred embodiment, an overview of the wavelet process will now be initially described with reference to the accompanying drawings.

Referring initially to FIG. 14, an original image 1400 is transformed utilizing a Discrete Wavelet Transform (DWT) into four subimages 1402–1408. The subimages or subbands are normally denoted LL1, HL1, LH1 and HH1. The 1 suffix on the subband names indicates level 1. The LL1 subband is a low pass decimated version of the original image.

The wavelet transform utilized can vary and can include, for example, Haar basis functions, Daubechies basis functions etc.

The LL1 subband is then in turn utilized and a second Discrete Wavelet Transform is applied as shown in FIG. 15 giving subbands LL2 (1502), HL2 (1504), LH2 (1506), HH2 (1508). This process is continued for example as illustrated in FIG. 16 wherein the LL4 subband is illustrated, the LL4 band decomposition process being referred to as an octave band filter bank with the LL4 subband being referred to as the DC subband. Obviously, further levels of decomposition can be provided depending on the size of the input image.

Each single level DWT can in turn be inverted to obtain the original image. Thus a J-level DWT can be inverted as a series of J-single level inverse DWT'S.

A coded image hierarchically can proceed by coding the DC subband. Then, the remaining subbands are coded in order of decreasing level. That is for a 4 level DWT, the subbands at level 4 are coded after the DC subband (LL4). That is the HL4, LH4 and HH4 subbands. The subbands at level 3 (HL3, LH3, and HH3) are then coded, followed by those at level 2 (HL2, LH2 and HH2) and then level 1 (HL1, LH1 and HH1).

With standard images, the encoded subbands normally contain the "detail" information or energy information in an image. Hence, they often consist of a sparse array of values and substantial compression can be achieved by quantisation of the subbands and efficient encoding of their sparse matrix form.

Although the present invention has application to image blocks of any size, for ease of description it will be assumed that an image eg. 1700 as illustrated in FIG. 17 is broken into 4×4 blocks 1702 of pixels. An enlarged view of the block 1702 is illustrated in FIG. 17*a*. The 4×4 blocks can then be independently fed to a wavelet transform unit 1354 of the encoder for wavelet transforming.

For most normal images, it is known that the wavelet transform process results in most of the energy or significance appearing in the lower frequency coefficients. Turning to FIG. 18, there is shown an example output 1800 of a standard wavelet process with the coefficients eg. 1802 being shown in a decimal and 8-bit binary format.

A coefficient encoder 1358 is responsible for encoding the coefficients 1800 of each 4×4 block in an efficient form in accordance with the second image compression method as described in the aforementioned section "1.4 Encoding Process of Second SWEET Image Compression Method". The coefficient encoder can also be modified, as will be apparent to a person skilled in the art, to encode the coefficients of an image in accordance with the first image compression method as described in the aforementioned section "1.1 Encoding Process of First SWEET Image Compression Method" in a similar efficient manner. However, for the purposes of the description, the preferred embodiment is described with reference only to the preferred apparatus and method for decoding coefficients encoded according to the second image compression method. In the preferred embodiment, the coefficient decoder 1300 (FIG. 13A) is responsible for the subsequent decoding of the encoded coefficients.

The basic encoding algorithm relies upon the expected magnitude of coefficients for standard images to efficiently encode the coefficients. Turning again to FIG. 15, it is assumed for operation of the encoding that the coefficient LL2 is likely to be the most significant followed by HL2, LH2, HH2 and then followed by the level 1 coefficients HL1, LH1 and HH1.

Figure 19:
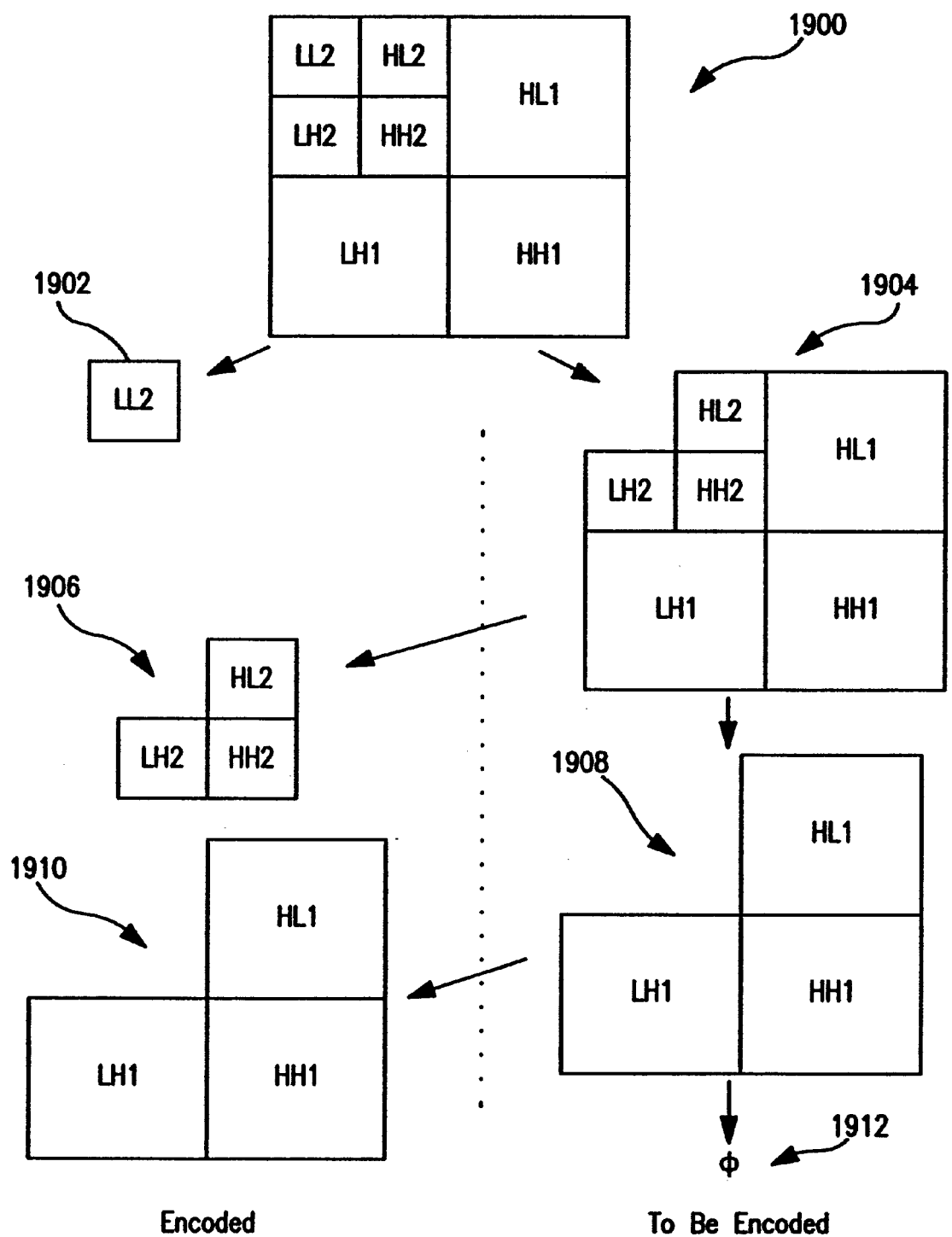
FIG. 19 illustrates the encoding methodology used in the preferred embodiment.

The original coefficient matrix is then as illustrated 1900 in FIG. 19. In the preferred embodiment, it is assumed that the coefficients take on 8-bit values in accordance with the example as illustrated in FIG. 18. The encoding methodology is to sort the coefficients by magnitude and output a zero for each leading zero of the most significant magnitude coefficient. Once a 1 value of the binary coefficient is reached, a "1" value is output followed by the LL2 coefficient 1902 is encoded, as it is assumed that this coefficient will always be the most significant. Next, the remaining coefficients 1904 are sorted in order of magnitude and a 0 is output for each level of leading zeros until no more zeros are left. Once this situation is reached, a 1 is output followed by the HL2, LH2 and HH2 coefficients which are split off and encoded 1906 leaving the remaining coefficients 1908.

The remaining coefficients 1908 are then sorted in order of magnitude and a 0 output for each remaining leading zero before a 1 value is reached. Once this is the case, a 1 is output and the remaining coefficients 1910 are encoded. This process of pulling off the lower frequency coefficients is continued, depending on the size of the input array until all the coefficients having been encoded and the null matrix is left 1912.

In FIG. 20, there is illustrated an example of the operation of the encoding of the 4×4 matrix 1800 of FIG. 18. Taking this example in detail, the coefficient having the decimal value 33 is initially the most significant coefficient and has two leading 0's. Therefore, two zeros are output 2000, 2002 for the bit plane levels 8 and 7. Next, the coefficient value decimal 33 results in the triggering of the coefficient output 2004, which is output after the outputting of a 1 value.

Subsequently, as no other coefficients have as significant binary bits set, a 0 is output 2006 so as to reduce the bit plane level number. At this bit plane, the bit plane of decimal value 17 is set which in turn triggers the output of a one and a series of coefficients 2008 (corresponding to the coefficients 1906 of FIG. 19), and leaving the coefficients corresponding to coefficients 1908 of FIG. 19. Subsequently, the next most significant decimal value is the value 4 and so a series of zeros is output at steps 2010, 2012 before outputting a one at bit plane level 3 (2014) followed by the coefficients 2016 corresponding to the HL1 coefficients of FIG. 19. Where a block has more than a single pixel coefficient, the algorithm is applied recursively on each of the sets of coefficients, hence, the algorithm is applied recursively on the HL1 coefficients, the LH1 coefficients and HH1 coefficients. This necessitates the operation of a push down stack to encode these coefficients. Hence, at the step 2018 of FIG. 19, the current bit plane is again bit plane level 3 and the coefficients corresponding to LH1 are examined to determine if any are significant at this bit plane. As this is not the case as zero is output 2018 followed by a 1 and the series of coefficients as illustrated 2020. Subsequently, the HH1 coefficients are independently recursed from bit plane level 3 (2022) and a series of zeros are output 2022, 2024 until bit plane 1 is reached where one value is output and the corresponding coefficients 2026.

As known previously, this encoding system is described in the aforementioned patent specification and further details of its operation can be found herein in the section entitled "1.4 Encoding Process of Second SWEET Image Compression Method". It is however, an object of the preferred embodiment of the present invention to provide for an efficient form of decoding a series of previously encoded coefficient data encoding.

Figure 21:
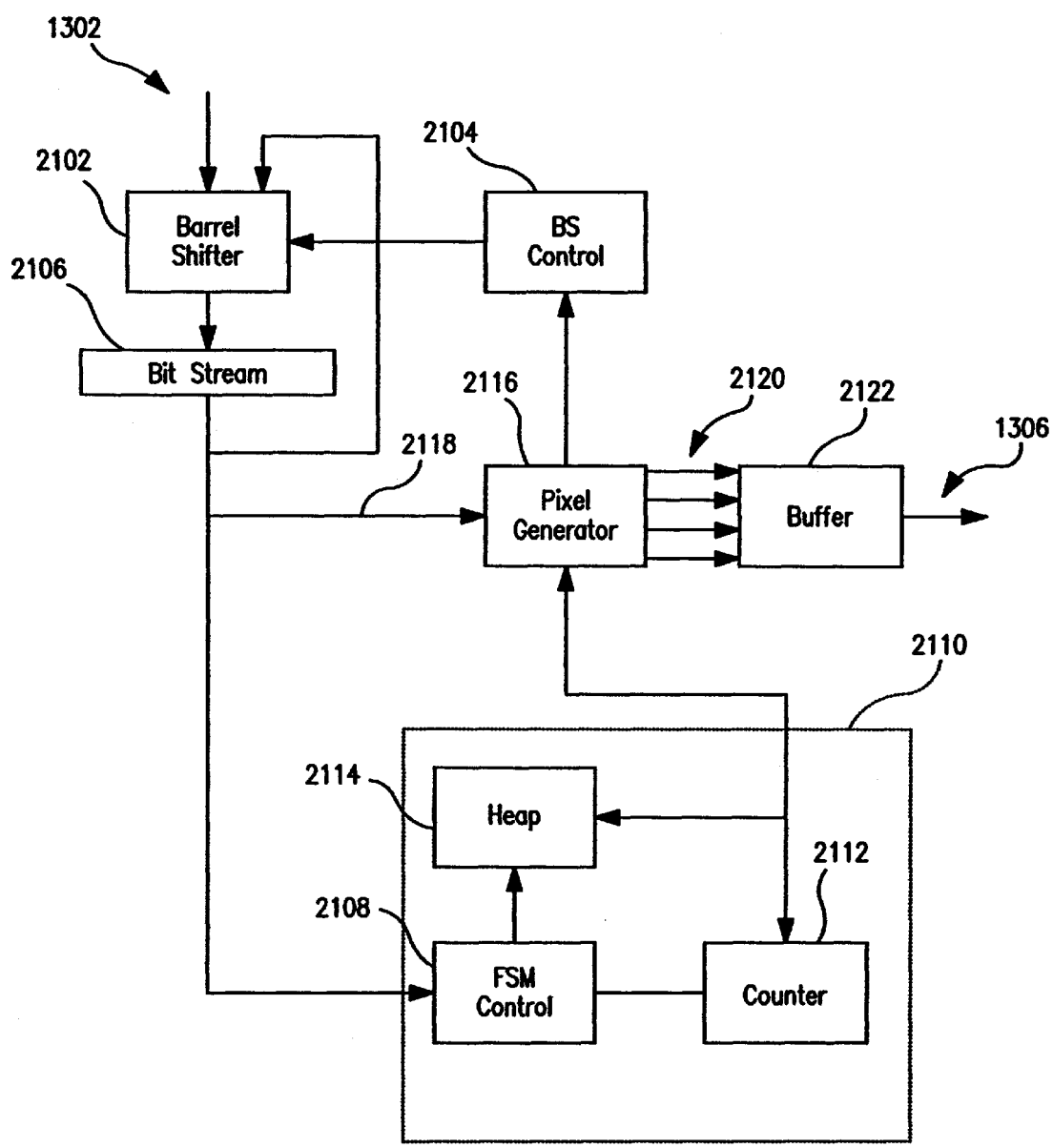
FIG. 21 is a schematic illustration of the decoder of the preferred embodiment.

Turning now to FIG. 21, there is illustrated one form of suitable arrangement of the coefficients decoder of FIG. 13A. The coefficients decoder takes an input stream 1302 which includes the previously encoded coefficients and outputs wavelet coefficients 1304 for feeding to an inverse wavelet transform unit. The input stream 1302 is fed to a barrel shifter 2102 that provides for the arbitrary shifting of the input streams. The barrel shifter 2102 includes a shift register and acts under the control of a barrel shifter control unit 2104. The output of the barrel shifter is fed to a bit stream register 2106 before being fed to a finite state machine 2108. The finite state machine forms part of a unit 2110, which is responsible for monitoring a current bit plane. The finite state machine 2108 acts to control the value within counter 2112 which keeps the count of a current bit plane number and is decremented when the significance values for a bit plane 0. A heap 2114 is also provided for when it is necessary to recurse, when, for example, encoding the HL1, LH1 and HH1 coefficients. Hence, it is necessary to provide for the storage of 3 values in heap 2114 for transfer to counter 2112 when encoding a new set of subband coefficients. The output of counter 2112 is forwarded to a pixel generator unit 2116. The pixel generator 2116 is responsible for forming output pixel values. The pixel generator accepts a number of bits 2118 from the shift register and generates the output wavelet coefficients according to the current bit plane level received from counter 2112. For example, if the current bitplane number level is 2 and the input coefficients are 11100001 then the following outputs 2120 are produced:

11100001→00000011, 00000010, 00000000, 00000001

The pixel generator 2116 generates 1, 3 or 4 coefficients at a time, depending on which coefficients are generated.

The finite state machine control unit 2108 keeps count of the current bit plane number and decides whether to decrement a counter when the input bit is 0 or release pixels when the input bit is 1. The FSM control unit 2108 stores the contents of the counter 2112 into the heap 2114 when it is necessary to recurse so as to deal with a set of coefficients on a particular level. Further, the FSM control unit loads the counter with the contents of the heap when a branch or recursion is finished.

A buffer 2122 is provided for storing the output pixels from the pixel generator 2116 for output to 1306 in natural order.

The bit stream generator 2106 is responsible for serializing the outputs from the barrel shifter 2102. The procedure for decoding a stream of previously encoded coefficients can then include the following steps:

1. Load the counter 2112 with the maximum number of bits.
2. Get first bit in the input stream.
3. If it is 0, decrement the counter 2112. Get next bit and loop back to step 3.
4. If it is 1, then the value in the counter 2112 is the number of bits per coefficient in the input stream. Activate the pixel generator 2116 to generate pixels.
5. The pixel generator 2116 takes the required number of bits from the shift register 2102 and pads the most significant bits with zeros and outputs then to buffer 2122. After that, the barrel shifter 2102 to shift away those data bits.
6. When the decoding process is required to decode multiple sets of subband coefficients (eg. HL1, LH1, HH1) the contents of the counter 2112 is saved into the heap 2114. Then the first set of subband coefficients are decoded.
7. After the decoding of one set of subband coefficients, the 2112 is loaded with the value at the top of the heap 2114.

Figure 22:
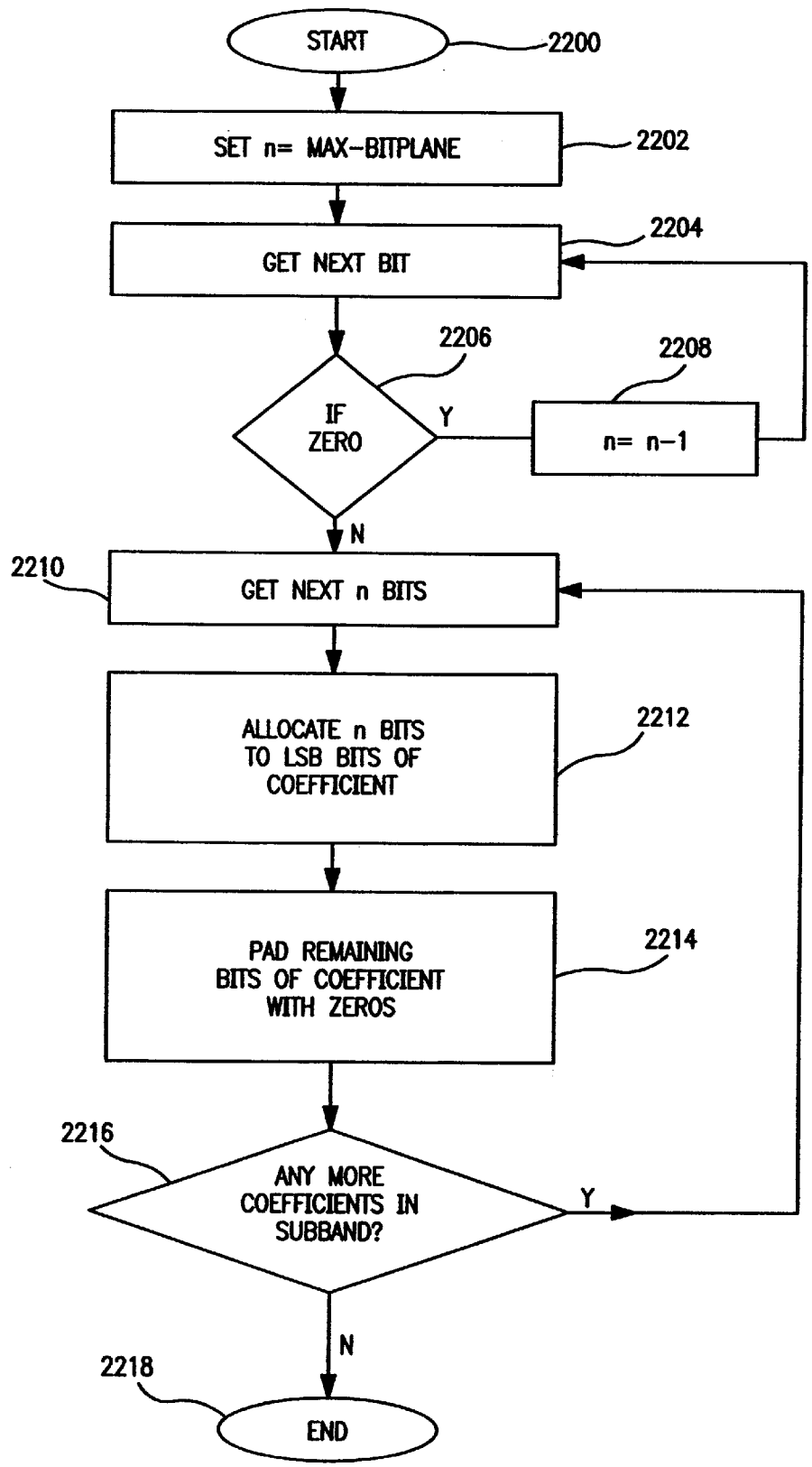
FIG. 22 is a flow chart of a method of decoding a bitstream of previously encoded coefficients.

FIG. 22 illustrates a flow chart of the preferred method of decoding a bitstream of previously encoded coefficients. The preferred method is applied to the bitstream to decode the coefficients for each sub-band in a predetermined order. For example, the method preferably decodes the coefficients from the bitstream in the sub-band order LL2, HL2,LH2, HH2,HL1,LH1, and HH1 as shown in FIG. 15. In step 2200, the process commences and the bitstream is inputted. In the next step 2202, a counter n is set to the value MAX_BITPLANE. This value equals the number of bits in each decoded coefficient (eg 8 bits). In the next step 2204, the next bit in the bitstream is accessed and the processing continues at decision block 2206. In the decision block 2206, a check is made whether the last accessed bit is zero. If the decision block 2206 returns Yes(true), then the counter is decremented by one in step 2208 and the processing returns to step 2204. If the decision block 2206 returns No(false), then the next n bits are accessed in step 2210 and the processing continues at step 2212. In step 2212, these n accessed bits are allocated to the least significant bits of the current coefficient. As mentioned previously, each coefficient has MAX_BITPLANE bits. In the next step 2214, the remaining bits of the current coefficient are padded with zeroes and the processing continues at decision block 2216. In decision block 2216, a check is made whether there exists any more coefficients in the current sub-band. If the decision block 2216 returns true(Yes) then the processing continues at step 2210. Otherwise the processing terminates at step 2218. After the decoding of one set of subband coefficients, the method can be called again and again until all subband coefficients of the blocks are decoded.

Alternate Embodiment of Apparatus(s)

Figure 8:
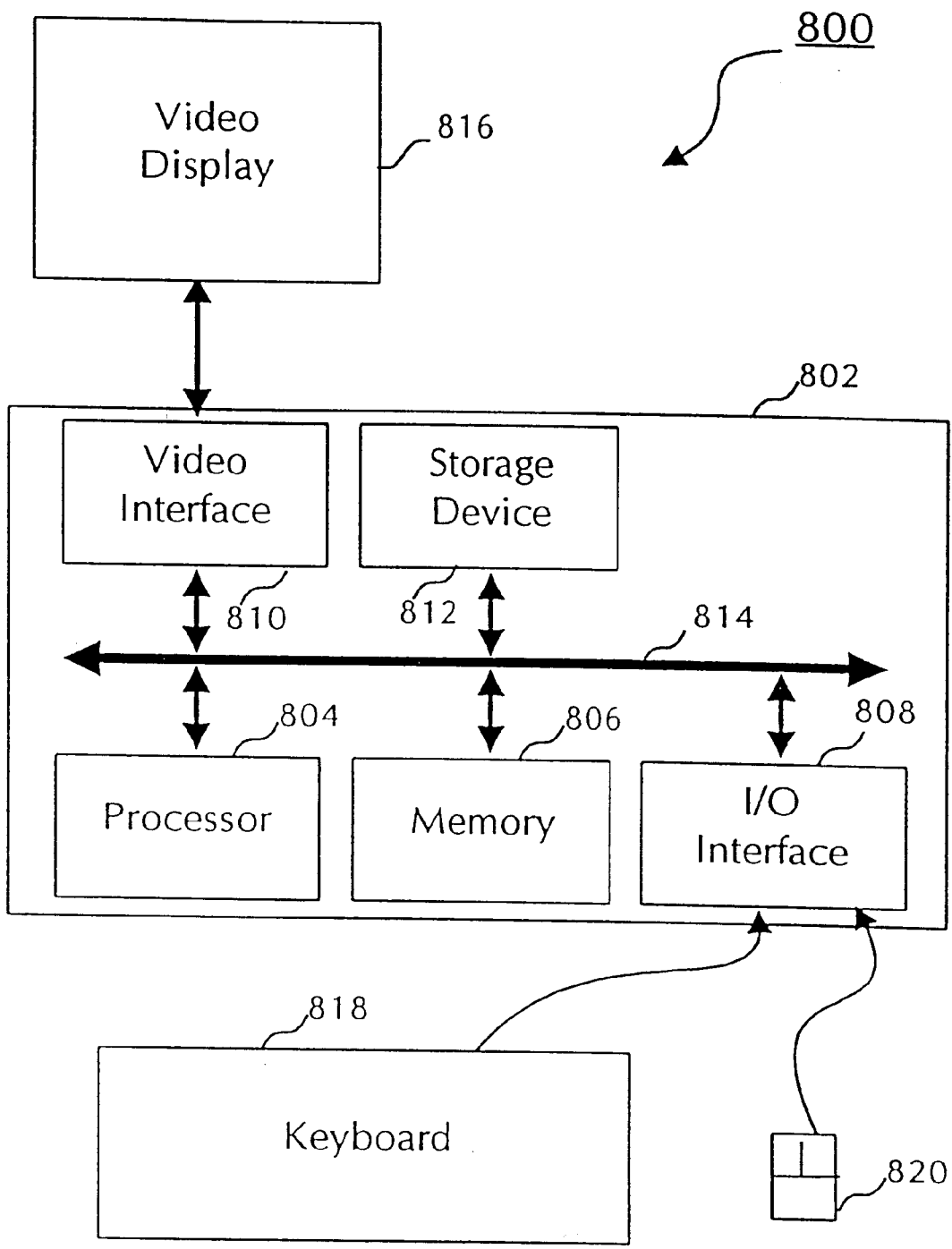
FIG. 8 is a block diagram of a general purpose computer.

Whilst the preferred decoder in accordance with the invention is implemented in dedicated hardware, the decoding processes can also be practiced using a conventional general-purpose computer, such as the one shown in FIG. 8., wherein the processes of FIG. 22 may be implemented as software executing on the computer. In particular, the steps of the decoding methods are effected by instructions in the software that are carried out by the computer. The software may be divided into two separate parts; one part for carrying out the decoding methods; and another part to manage the user interface between the latter and the user. The software may be stored in a computer readable medium, including the storage devices described below, for example. The software is loaded into the computer from the computer readable medium, and then executed by the computer. A computer readable medium having such software or computer program recorded on it is a computer program product. The use of the computer program product in the computer preferably effects an advantageous apparatus for decoding coded representations of digital images in accordance with the embodiments of the invention.

The computer system 800 consists of the computer 802, a video display 816, and input devices 818, 820. In addition, the computer system 800 can have any of a number of other output devices including line printers, laser printers, plotters, and other reproduction devices connected to the computer 802. The computer system 800 can be connected to one or more other computers via a communication interface 808c using an appropriate communication channel 830 such as a modem communications path, a computer network, or the like. The computer network may include a local area network (LAN), a wide area network (WAN), an Intranet, and/or the Internet The computer 802 itself consists of a central processing unit(s) (simply referred to as a processor hereinafter) 804, a memory 806 which may include random access memory (RAM) and read-only memory (ROM), input/output (IO) interfaces 808a, 808b & 808c, a video interface 810, and one or more storage devices generally represented by a block 812 in FIG. 8. The storage device(s) 812 can consist of one or more of the following: a floppy disc, a hard disc drive, a magneto-optical disc drive, CD-ROM, magnetic tape or any other of a number of non-volatile storage devices well known to those skilled in the art. Each of the components 804 to 812 is typically connected to one or more of the other devices via a bus 814 that in turn can consist of data, address, and control buses.

The video interface 810 is connected to the video display 816 and provides video signals from the computer 802 for display on the video display 816. User input to operate the computer 802 can be provided by one or more input devices 808b. For example, an operator can use the keyboard 818 and/or a pointing device such as the mouse 820 to provide input to the computer 802.

The system 800 is simply provided for illustrative purposes and other configurations can be employed without departing from the scope and spirit of the invention. Exemplary computers on which the embodiment can be practiced include IBM-PC/ATs or compatibles, one of the Macintosh (TM) family of PCs, Sun Sparcstation (TM), or the like. The foregoing is merely exemplary of the types of computers with which the embodiments of the invention may be practiced. Typically, the processes of the embodiments, described hereinafter, are resident as software or a program recorded on a hard disk drive (generally depicted as block 812 in FIG. 8) as the computer readable medium, and read and controlled using the processor 804. Intermediate storage of the program and pixel data and any data fetched from the network may be accomplished using the semiconductor memory 806, possibly in concert with the hard disk drive 812.

In some instances, the program may be supplied to the user encoded on a CD-ROM or a floppy disk (both generally depicted by block 812), or alternatively could be read by the user from the network via a modem device connected to the computer, for example. Still further, the software can also be loaded into the computer system 800 from other computer readable medium including magnetic tape, a ROM or integrated circuit, a magneto-optical disk, a radio or infra-red transmission channel between the computer and another device, a computer readable card such as a PCMCIA card, and the Internet and Intranets including email transmissions and information recorded on websites and the like. The foregoing is merely exemplary of relevant computer readable mediums. Other computer readable mediums may be practiced without departing from the scope and spirit of the invention.

The foregoing only describes a small number of embodiments of the present invention, however, modifications and/or changes can be made thereto by a person skilled in the art without departing from the scope and spirit of the invention. The present embodiments are, therefore, to be considered in all respects to be illustrative and not restrictive.

What is claimed is:

1. An apparatus for decoding a bitstream of previously encoded coefficients, the apparatus comprising:

an input device for receiving said bitstream;

a bit plane level monitoring device connected to said input device and adapted to monitor a current bit plane level from said bitstream, wherein the current bit plane level decrements in response to an insignificant bit in the bitstream; and a pixel generation device interconnected to said input device and said bit plane level monitoring device and adapted to utilize said current bit plane level for generating output coefficient values each having a predetermined size in response to a significant bit in the bitstream.

2. An apparatus as claimed in claim 1, wherein said bit plane level monitoring device comprises:

a finite state control machine interconnected to said input device and adapted for determining bit plane level changes in said bitstream;

a counter interconnected to said finite state control machine for monitoring said current bit plane level; and a heap store interconnected to said counter and said finite state control machine and adapted to store bit plane level values for utilization in recursion operations by said finite state control machine, wherein said finite state machine acts to decrement said counter upon the receipt of an insignificant bit in said bitstream and further to control the reloading of said counter upon completion of said recursion operations.

3. An apparatus as claimed in claim 1, further comprising:

a buffer interconnected to said pixel generation device for storing said coefficient values for subsequent output in a predetermined order.

4. An apparatus as claimed in claim 1, wherein said input device comprises a barrel shifter operated under the control of said pixel generation device to excise coefficient value portions from said bitstream.

5. A method of decoding a bitstream of previously encoded coefficients, the method comprising the steps of:

(i) inputting the bitstream of encoded coefficients;

(ii) determining a current bitplane level of bits within said bitstream, wherein the current bitplane level decrements in response to an insignificant bit in the bitstream; and (iii) generating output coefficient values each having a predetermined number of bits utilizing said current bitplane level and bit fragments within said bitstream in response to a significant bit in the bitstream.

6. A method as claimed in claim 5, wherein the generating step (iii) comprises the sub-steps of:
   (iii)(a) selecting a number of bits from a bit fragment of the bitstream, where said number corresponds to the number of the current bitplane level;
   (iii)(b) allocating said number of bits to the least significant positions of a said coefficient value; and
   (iii)(c) padding the remainder of the positions of said coefficient value with zeros.

7. A method as claimed in claim 5, wherein the method comprises after step(iii) the step of:
   (iv) eliminating said bit fragments from said bitstream.

8. An apparatus for decoding a bitstream of previously encoded coefficients, the apparatus comprising:
   input means for inputting the bitstream of encoded coefficients;
   determination means for determining a current bitplane level of bits within said bitstream, wherein the current bitplane level decrements in response to an insignificant bit in the bitstream; and
   generation means for generating output coefficient values each having a predetermined number of bits utilizing said current bitplane level and bit fragments within said bitstream in response to a significant bit in the bitstream.

9. An apparatus as claimed in claim 8, wherein the generation means comprises:
   selection means for selecting a number of bits from a bit fragment of the bitstream, where said number corresponds to the number of the current bitplane level;
   allocation means for allocating said number of bits to the least significant positions of a said coefficient value; and
   padding means for padding the remainder of the positions of said coefficient value with zeros.

10. An apparatus as claimed in claim 8, wherein the apparatus comprises:
   elimination means for eliminating said bit fragments from said bitstream.

11. A computer program product including a computer readable medium having recorded thereon a computer program for decoding a bitstream of previously encoded coefficients, the computer program product comprising:
   input means for inputting the bitstream of encoded coefficients;
   determination means for determining a current bitplane level of bits within said bitstream, wherein the current bitplane level decrements in response to an insignificant bit in the bitstream; and
   generation means for generating output coefficient values each having a predetermined number of bits utilizing said current bitplane level and bit fragments within said bitstream in response to a significant bit in the bitstream.

12. A computer program product as claimed in claim 11, wherein the generation means comprises:
   selection means for selecting a number of bits from a bit fragment of the bitstream, where said number corresponds to the number of the current bitplane level;
   allocation means for allocating said number of bits to the least significant positions of a said coefficient value; and
   padding means for padding the remainder of the positions of said coefficient value with zeros.

13. A computer program product as claimed in claim 11, wherein the product comprises:
   elimination means for eliminating said bit fragments from said bitstream.

14. A method of decoding a bitstream of previously encoded coefficients, the method comprising the steps of:
   storing a predetermined number of bits of said bitstream;
   determining from said stored bits a current bitplane level, wherein the current bitplane level decrements in response to an insignificant bit in the stored bits; and
   generating output coefficient values each having a predetermined number of bits in response to a significant bit in the stored bits, wherein said generating step comprises the sub-steps of:
      selecting a number of bits from said stored bits, wherein said number corresponds to the number of the current bitplane level,
      allocating said number of bits to the least significant positions of a said coefficient value, and
      padding the remainder of the positions of said coefficient value with zeros.

15. An apparatus for decoding a bitstream of previously encoded coefficients, the apparatus comprising:
   an input circuit for storing a predetermined number of bits of said bitstream;
   a controller for determining from said stored bits a current bitplane level, wherein the current bitplane level decrements in response to an insignificant bit in the stored bits; and
   a pixel generator for generating output coefficient values each having a predetermined number of bits in response to a significant bit in the stored bits, wherein said pixel generator comprises:
      a selection device for selecting a number of bits from said stored coefficient stream, wherein said number corresponds to the number of the current bitplane level,
      an allocation device for allocating said number of bits to the least significant positions of a said coefficient value, and
      a padding device for padding the remainder of the positions of said coefficient value with zeros.

16. An apparatus as claimed in claim 15, wherein said controller comprises:
   a finite state control machine connected to said input circuit and adapted for determining bit plane level changes in response to insignificant bits in said stored bits;
   a counter connected to said finite state control machine for storing a current bit plane level; and
   a heap store connected to said counter and said finite state control machine and adapted to store bit plane level values for utilization in recursion operations by said finite state control machine,
   wherein said finite state machine acts to decrement said counter upon the receipt of an insignificant bit in said stored bits and further to control the reloading of said counter upon completion of said recursion operations.

17. An apparatus as claimed in claim 15, wherein said input circuit comprises a barrel shifter operated under the control of said pixel generator to output a number of bits to the pixel generator.

18. A computer program product comprising a computer program for decoding a bitstream of previously encoded coefficients, wherein the product comprises:

input means for storing a predetermined number of bits of said bitstream;

determination means for determining from said stored bits a current bitplane level, wherein the current bitplane level decrements in response to an insignificant bit in the stored bits; and generation means for generating output coefficient values each having a predetermined number of bits in response to a significant bit in the stored bits, wherein said generation means comprises:

selection means for selecting a number of bits from said stored bits, wherein said number corresponds to the number of the current bitplane level, allocation means for allocating said number of bits to the least significant positions of a said coefficient value, and padding means for padding the remainder of the positions of said coefficient value with zeros.

* * * * *

UNITED STATES PATENT AND TRADEMARK OFFICE
CERTIFICATE OF CORRECTION

PATENT NO. : 6,411,736 B1
APPLICATION NO. : 09/161771
DATED : June 25, 2002
INVENTOR(S) : Dominic Yip et al.

It is certified that error appears in the above-identified patent and that said Letters Patent is hereby corrected as shown below:

ON THE TITLE PAGE ITEM (73) ASSIGNEE

"Canon Kabushiki Kaisha, Tokyo (JP)" should read --Canon Kabushiki Kaisha, Tokyo (JP) and Canon Information Systems Research Australia PTY. LTD., North Ryde (AU)--.

COLUMN 5

Line 15, "that" (second occurrence) should read --than--; and
Line 52, "may" should read --may be--.

COLUMN 8

Line 41, "is" (first occurrence) should be deleted.

Signed and Sealed this

Sixteenth Day of September, 2008

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 6,411,736 B1 | Page 1 of 1 |
| APPLICATION NO. | : 09/161771 | |
| DATED | : June 25, 2002 | |
| INVENTOR(S) | : Dominic Yip et al. | |

It is certified that error appears in the above-identified patent and that said Letters Patent is hereby corrected as shown below:

ON THE TITLE PAGE ITEM (73) ASSIGNEE

"Canon Kabushiki Kaisha, Tokyo (JP) and Canon Information Systems Research Australia PTY. LTD., North Ryde (AU)" should read --Canon Kabushiki Kaisha, Tokyo (JP)--.

Signed and Sealed this

Second Day of December, 2008

JON W. DUDAS
*Director of the United States Patent and Trademark Office*